(12) United States Patent
Boudville

(10) Patent No.: US 11,351,446 B2
(45) Date of Patent: Jun. 7, 2022

(54) THEME PARKS, ESPORTS AND PORTALS

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 0 days.

(21) Appl. No.: 16/501,305

(22) Filed: Mar. 22, 2019

(65) Prior Publication Data
US 2021/0339123 A1      Nov. 4, 2021

(51) Int. Cl.
*A63F 13/216* (2014.01)
*A63F 13/35* (2014.01)
*A63F 13/217* (2014.01)
*A63F 13/31* (2014.01)

(52) U.S. Cl.
CPC .......... *A63F 13/217* (2014.09); *A63F 13/216* (2014.09); *A63F 13/31* (2014.09); *A63F 13/35* (2014.09)

(58) Field of Classification Search
None
See application file for complete search history.

(56) References Cited

U.S. PATENT DOCUMENTS

| | | | | |
|---|---|---|---|---|
| 2012/0094768 | A1* | 4/2012 | McCaddon | G06F 3/0482 463/42 |
| 2015/0241219 | A1* | 8/2015 | Santori | G01C 21/00 701/532 |
| 2018/0350144 | A1* | 12/2018 | Rathod | A63F 13/216 |
| 2020/0164268 | A1* | 5/2020 | Weston | A63H 30/04 |

* cited by examiner

*Primary Examiner* — Damon J Pierce

(57) ABSTRACT

Theme parks host visitors' games, watched by remote viewers (esports). Games are played on visitors' phones. A game can involve searching for clues indoors and outdoors. A game can be played at night for a live daytime audience. Parks have portals simulating sending items between parks. An item is put into a portal, copies appear at other portals. An item is put into a portal, items of other types appear at multiple portals. An item is put into a portal, a copy appears at a randomly picked portal. A portal gets an item representing a young individual (eg. kitten), an item representing an older individual (eg. cat) appears at another portal. Visitors and viewers can join teams. A team can span different parks. A portal can be controlled by a team.

17 Claims, 14 Drawing Sheets

Portal to another Theme Park

Figure 6 – Deciding to open a game in a park

Figure 9  Tip Jar

Figure 10 Portal to another Theme Park

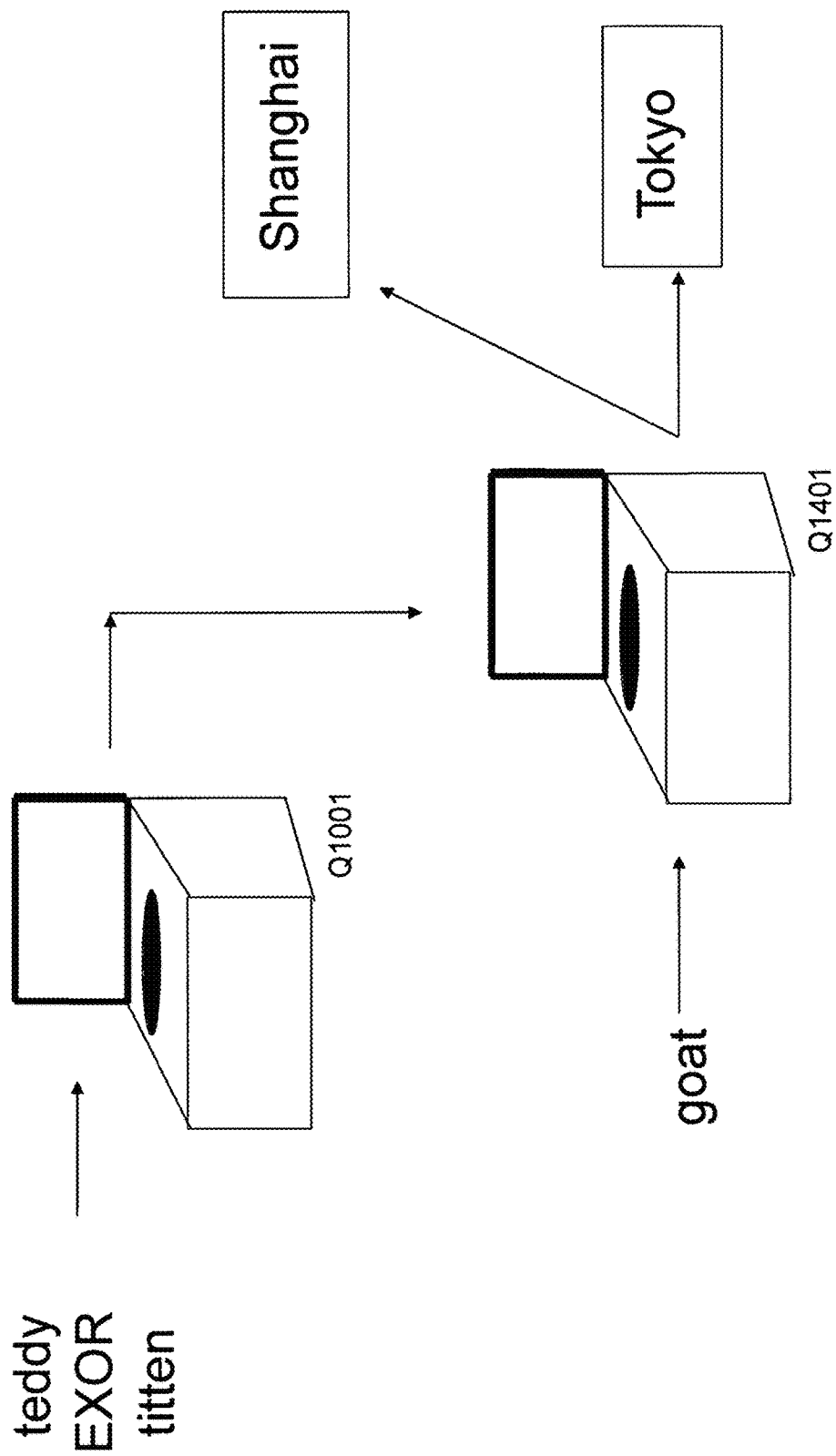
Figure 14  Chaining portals

THEME PARKS, ESPORTS AND PORTALS

TECHNICAL FIELD

Theme parks and esports.

BACKGROUND

Theme parks have exhibits or themes. These are interactive experiences for visitors. Parks struggle to make unique and more memorable experiences so visitors will keep visiting, as well as having others visit the park for the first time. The competition is other parks and other recreational pursuits, including computer games.

A problem a theme park can have is the physical size. There are legal limits on maximum attendance. While the marginal cost of an extra visitor might be small, it is expensive in terms of land and buildings for a park to significantly expand its footprint.

Another problem is that visiting a park is too expensive for many people. In terms of travel time and accommodation. Or also if the people are in less developed countries, with lower incomes compared to the incomes of most visitors.

Esports have become popular. Fans watch players play computer games. The fans might watch on their own computers (mobile phones, laptops, PCs . . . ) via an aggregated viewing platform like Twitch™. The platform shows live or recorded video of games. The players are playing (or have played) the games. The fans are remote from the players. In general, the fans are also remote from each other. They can be at many different locations in the world.

In another esports modality, players and fans are in a stadium. The game is also broadcast so that fans not in the stadium can watch remotely.

BRIEF DESCRIPTION OF THE DRAWINGS

FIG. 14 shows the output of a portal controlling another portal.

DETAILED DESCRIPTION OF THE PREFERRED EMBODIMENT

Figure 1:
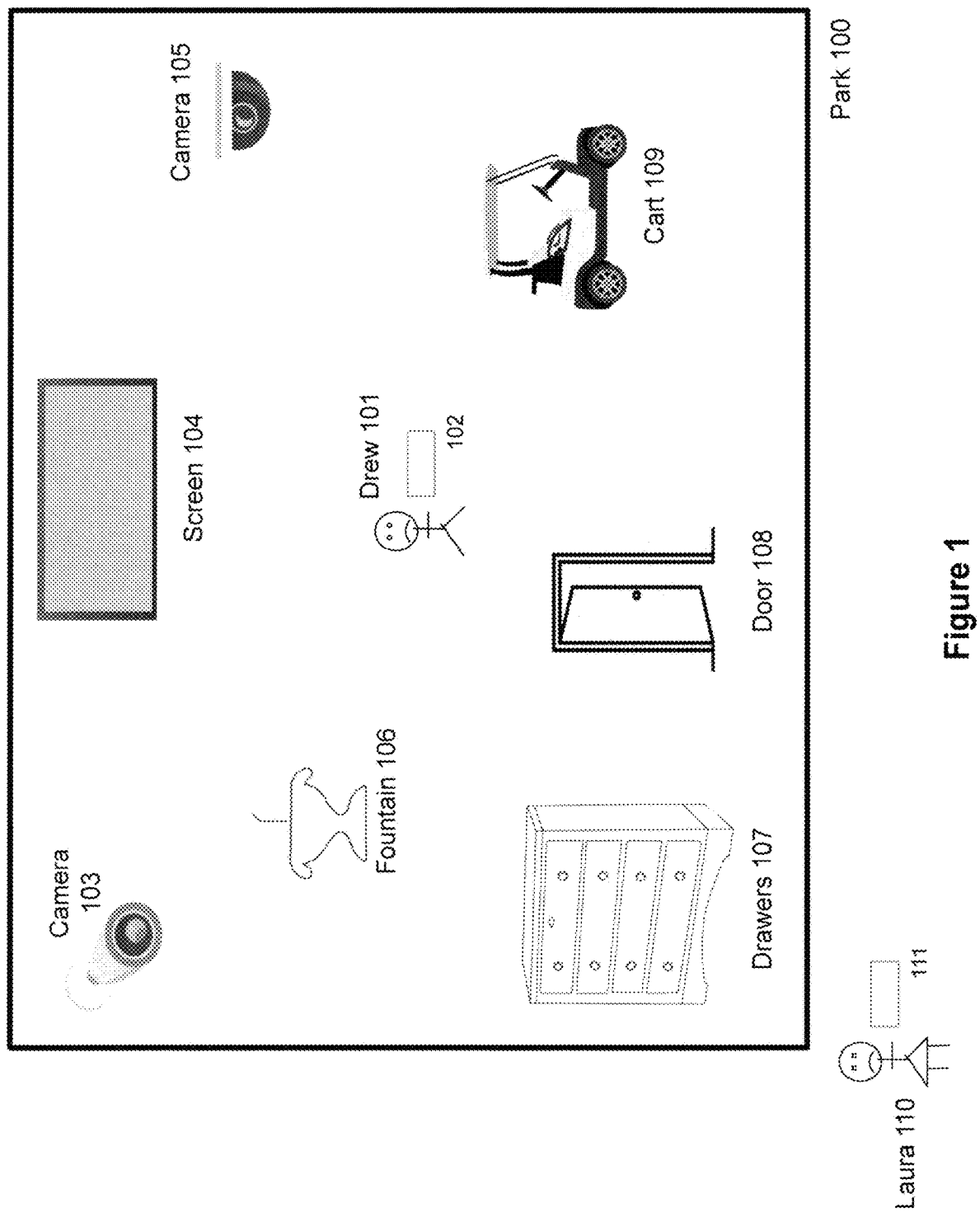
FIG. 1 is a park with a visitor, a viewer and devices.

What we claim as new and desire to secure by letters patent is set forth in the following claims.

This application references our recent US patent pending, "Linket, esports and a theme park", filed 18 Dec. 2018, Ser. No. 16/350,658.

We use "visitor" to mean a visitor inside a theme park. And "viewer" will mean a person outside any theme park who interacts remotely with visitors via a mobile device.

The current application has the following sections:
1] One Theme Park;
2] Two Theme Parks: visitor-visitor interaction;
3] Two Theme Parks: visitor-visitor-viewer;
4] Two Theme Parks: visitor-visitor-2 viewers;
5] Night and Day, Summer and Winter;
6] Handoff from 1 Theme Park to Another;
7] Picking a 2nd Theme Park;
8] Guiding a Viewer to a Team;
9] Portal between 2 Theme Parks;
9.1] Multiplier (Fan out);
9.2] Deleter;
9.3] Transformer;
9.3.A] Aging;
9.3.B] Fountain of Youth;
9.3.C] Gender change;
93.D] Occupation change;
9.4] Randomiser;
9.5] Merger (Fan in);
10] Reification and Anti-Reification;
11] Smart Toy that uses portals;
12] Haunted Houses, Cruise Ships;
1] One Theme Park;

Visitors go thru a theme park and are entertained by one or more themes. See FIG. 1. It shows visitor Drew 101 with his mobile device 102. He is in park 100. Outside the park, is Laura 110 with her device 111, which could be mobile or non-mobile. In general, she is not in the same city as Drew and she does not know him. There could be others with Drew, but for simplicity, we currently consider only Drew as a visitor.

Near Drew can be cameras 103 and 105. There could be more. These can be emplaced in fixed locations. Some might be attached to moving devices. Drew could be walking, or sitting in a static location. Or in a moving device. Drew might appear in the Field of View (FoV) of a camera.

Near Drew can be an electronic screen 104, showing images or information. There might be several screens. So far, devices 103-105 can be considered purely electronic devices.

Near Drew can be an electromechanical fountain 106. As with the cameras and screens, this is controlled by the park. The fountain can be turned on or off remotely. When running, the volume of water in the jets and the heights of the jets can also be controlled remotely. Associated with the fountain might be a loudspeaker playing music, possibly synchronised with the height of the jets. There might also be lights of different colours shining on or through the fountain. Loudspeaker and lights can also be remotely controlled.

Device 107 is a chest of drawers. Some or all drawers might be locked and unlocked remotely. A drawer might have mechanical actuators that can open and close the drawer. Equivalently, instead of a chest of drawers, there might be a filing cabinet.

Door 108 might be a door that can open and close without manual operation by Drew. Or it could have a lock that is remotely controlled (in part). One type of door 108 could be a garage or warehouse roll up door.

Cart 109 can be controlled remotely. It could carry Drew and others.

Another device (not shown) could be a platform that rises or lowers from the ground. (This includes a lift.) Or it could be extruded or retracted from a wall. It could be an HVAC device, or part of one, that influences temperature or air flow. It could be a wave generator that affects the flow of water in an aquatic environment. It could be shutters for a window, that open and close. It could be a window that opens and closes.

The remote influencing of air flow can extend to controlling the rate of rotation (angular velocity) of a fan.

Another device could control the release of aromas in the vicinity of Drew. Triggers his olfactory sense.

Another device could be a loudspeaker whose volume or other audio parameter is adjusted. Or whose direction that the speaker is pointed in can be remotely controlled.

Another device might make a change detectable via tactile or haptic means by Drew. For example, there might be a panel in a wall that can be pushed in by Drew, where sometimes it is remotely controlled so that it cannot be pushed.

Another device might be a camera whose lens can be adjusted to pan, tilt and zoom. Or it might be a camera that can be moved, like along a rail.

Another device could move on the ground, or on a ceiling or wall. For example, it might be a giant spider that crawls along a wall and ceiling. Or it might be an elf that walks on the ground.

Another device might be a seat (that Drew sits on) that vibrates. Similar to what some movie theatres have.

Another device could be an enclosure (cage?) that holds a real or fake animal, where the enclosure could be opened to release the animal near Drew.

Another device might be a container holding a clue, perhaps a physical gadget. The device might open and release the clue depending on actions by Drew and others. A variant is where the clue is actually a reward (like a stuffed toy or a bottle of wine).

Another device could be a drone. Presenting an outdoors panoramic view of the park. The drone has a camera (or several). The drone and its cameras can be controlled by the park to focus on various sections.

Another device could be a hologram projector. A remote user could temporarily control this to show or not show a hologram to visitors. This can also extend to a remote user being able to control where the projector is pointing and the spatial location of the hologram.

There could be multiple such devices.

At present some or all of these cases exist. One characteristic is that the controlling of the devices by the park is largely based on preset decisions and perhaps by the actions of the visitors. It can be useful to the park if the experiences are made more unique. Giving incentive for visitors to come back for new experiences. But there is another issue. Parks have advertising costs for billboards, TV commercials and the like. In part to sustain brand awareness and to bring in new visitors.

Our application combines the parks with another recent phenomenon—esports. In the last 10 years it has become clear that people will pay to watch others play computer games. They will pay to watch in person (in a stadium) and remotely. It is the latter idea that is used here. The park uses cameras 103 and 105 to show static images and video to Laura. It can also use microphones (not shown in FIG. 1) to pick up audio and transmit to Laura's device. The microphones can be installed by the park in the vicinity of visitors. They can pick up words spoken by the visitors, and audio emitted by the park's loudspeakers.

In terms of visitors' privacy, the park can indicate to visitors that certain sections of the park have these cameras and microphones. And when the visitors go there, they consent to such uses.

An elaboration is possible concerning visitors' images. When a camera shows a visitor, it has software doing image recognition to detect this. It can blur the visitor's face. Or it can replace the visitor's face or also the rest of the visitor by a "skin"—an artificial image. Skins are a common concept in gaming, where a player can pick a skin. Those uses are often where the entire environment in the game is artificial. In the park, the skin can be a software overlay that follows the real person around in the video.

This can be extended. When Drew entered the area, he can have on his mobile device an app made by the park. The app could use a linket like [Medieval Visitor] if the theme is a medieval village. When Drew clicked the linket, the app was installed and run on his device. The app could offer him a choice of various cartoon personas—traveller, publican, smith, royal lady, barmaid, baker. (The persona he picks could be male or female.) Then in his wanderings thru the themed area, the video replaces him by his persona.

Or Drew downloaded the app without clicking on a linket. The park could have used other means to induce him to do this.

The app could let him have a nickname. In addition to his persona name, or in exclusive—or to it. So if there is a persona "Smith" (a metal worker), Drew might be "Wanderer Smith".

In general the viewer app and visitor app are different. But a park could merge both into one app. One consideration is that the visitor app is for a mobile device. The viewer app can have several versions—for mobile and fixed devices. Because the viewer can be walking around with a mobile device, or sitting down at a PC, for example.

Laura can remotely see and perhaps hear Drew and others as they progress thru the village. The park can offer different views to Laura. One might be a map view, instead of images. The visitors are shown as various icons. The app can show the various devices in the area. If the area has a game approach, where the visitors compete to complete tasks, Drew's and Laura's apps can show the competitors' progress, if this is meaningful.

The viewer app could let Laura search the visitor data for some criteria. One is to show any visitors who have their own linkets. These users might be media influencers and could be interesting for Laura to follow them thru the park.

It is a short conceptual distance to let Drew's visitor app control some of the electromechanical devices. This increases interactivity by him. He is not just passively walking or riding thru a themed area. For example, the area could have a room with a locked door. Drew uses his app to answer some questions based on what he saw (or did) earlier. If correct, the door unlocks.

The park can monetize the viewer app by showing ads. These can include offers to buy a ticket to the park. Or to other parks owned by the same firm. With a possible discount as an inducement. If the park has associated items for sale, like toys or movies, these can also be shown on the viewer app.

To encourage use of the viewer app, there could be a message board. Current viewers can write messages viewable by all or some viewers. This interactivity improves stickiness of the app.

The viewer app and the visitor app might have the same server.

Figure 2:
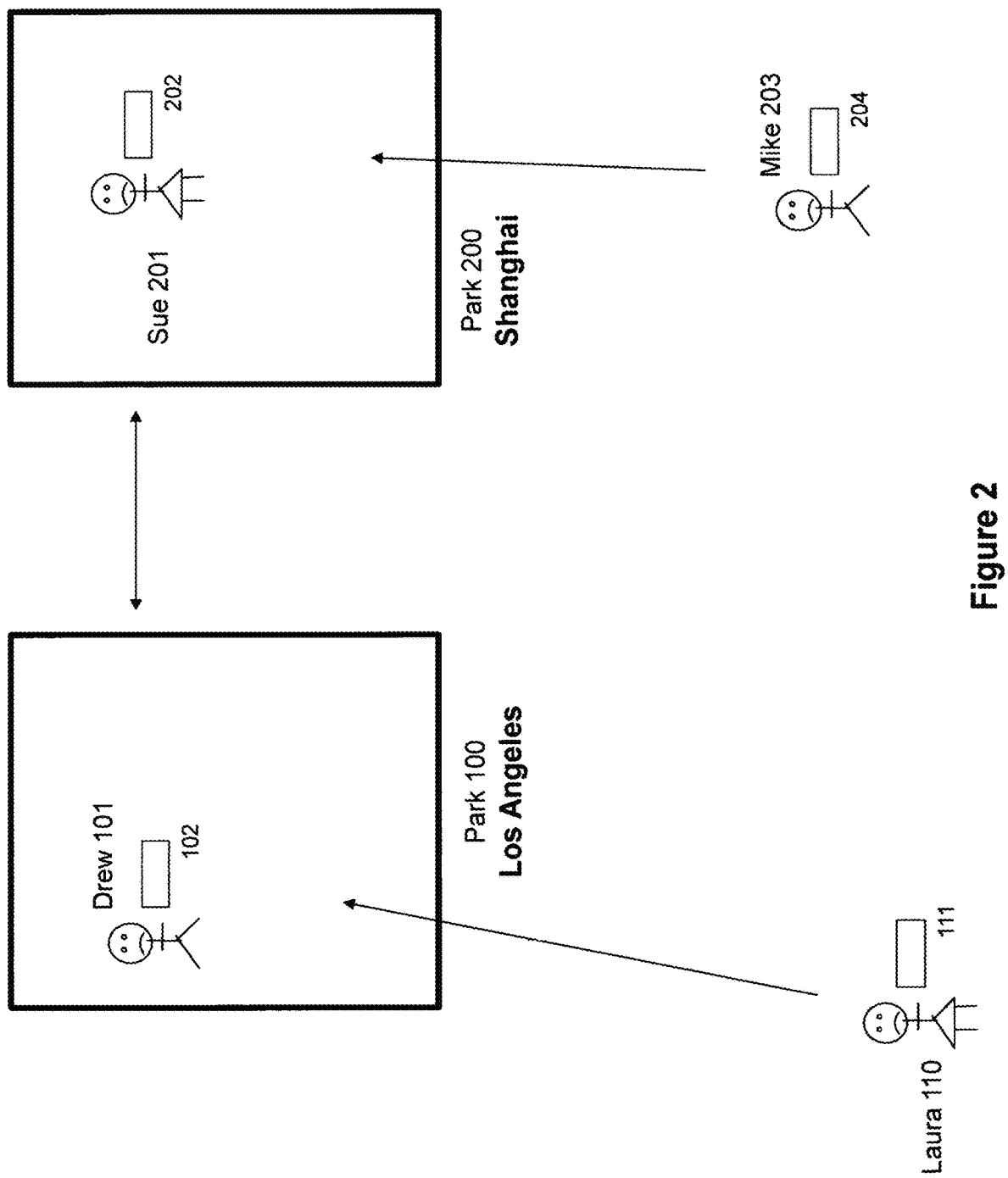
FIG. 2 is 2 theme parks with visitors.

2] Two Theme Parks: Visitor-Visitor Interaction;

FIG. 2 shows 2 theme parks with visitors in each. Park 100 can be in one location, eg. Los Angeles. Park 200 can be in another place, eg. Shanghai. Sue 201 is a visitor in Park 200. She has mobile device 202. As in FIG. 1, Laura 110 is a viewer interacting with Park 100. While Mike 203 is a viewer with mobile device 204 interacting with Park 200. In general each park will have many visitors and viewers. For simplicity FIG. 2 just shows one visitor and one viewer for each park. Typically the parks are owned by the same firm. But this application also includes the case where each park is owned by a different firm, and the firms cooperate in the manner described in this section.

Drew is going through park 100 in some activity like a scavenger hunt. He is looking for clues, where often each clue leads to another clue. He might also be looking for prizes. A clue can point to a prize. Similarly Sue is going through park 200. Suppose the activity or game is the same for both of them. We will use activity and game interchangeably. The game spans both parks. We assume the game is played via the mobile devices. These might be the personal mobile devices (eg. cellphones) brought into the parks by Drew and Sue. Or they might be mobile devices loaned by the parks to them. In this case, the devices could be AR headsets (eg. Microsoft Corp's HoloLens™ or Magic Leap Corp's eponymous device).

Suppose the game lets Drew and Sue find each other in instances of the game on their devices. In general they have never "met" before going to the parks. Another case is where they knew each other before this, and formed a team that goes to the parks.

The game can be designed to let teams form and cooperate to aid each other in finding clues and prizes in the parks. Imagine that Drew is near door 108. But it is closed and locked and he cannot physically or via his mobile device unlock and open the door. He communicates with Sue through their game instances on their mobile devices. He passes some information about door 108. Sue finds that she can unlock the door on her device. She does so by sending a remote signal from her game. He can now open the door and walk through the doorway. This assumes the game server for both parks can interact with the controls of door 108 to enable the action.

At the simplest level, this shows how members of a team in different parks can cooperate to solve a problem. It also emphasises the physical nature of the game experiences. This differs from a game purely played on electronic screens. It uses the experiential physicality of the parks to enhance the game play. Clearly this example is where Drew undergoes the physical event. At another time Sue could be in front of a chest of drawers like those depicted as item 107. But her chest of drawers is in park 200. The drawers might be closed and unable to be opened by her. But in the game there is some indication that a player in park 1 may have a "key" to open the drawers. She asks Drew. The game lets Drew check the status of the drawers in park 2. He finds that he can open them. He does so by some command in his game instance. One of the drawers is then operated remotely by electromechanical means to open in front of Sue. Or the drawer might have a status light that turns on, to indicate that Sue can now manually open the drawer. Or Sue's game on her device gives a signal that she can open the drawer. This signal could be a combination of visual (graphical) means on her device screen, possibly with an accompanying audio signal. For example, there might only be an audio from her device saying "You can now open drawer A in the chest of drawers".

To enhance interactivity across the parks, the game could let Sue and Drew communicate by various means. There could be text messaging between them, in the game. They might be able to talk via the game. They could take photos with their mobile devices, in the game, and send these to each other. Assuming sufficient bandwidth, they might also be able to send streaming video to each other.

A variant is where the game has different behavior in the parks. For example, in park 100, the game can let a user in park 200 remotely control some doors. While in park 200 the game lets a user in park 100 remotely control fountains and some windows. Also, there is no requirement that the parks have the same inventory of electromechanical devices that are remotely controllable. In part, this might be because if the parks might have different sets of themes, where the themes in Shanghai were chosen to resonate with Chinese culture, and ditto for the park in Los Angeles vis a vis US culture.

The above was where a user in one park directly operated a device in the other park. A variant is where when Drew is at door 108, Sue has a virtual key that she passes to Drew's game instance. Drew then has to do something with that key on his device in order for the door to open. He might have to furnish a second virtual item to be used with the key.

Another variant is reification, where a virtual item is made real. Imagine that Sue finds or captures (the difference is largely a function of the context of the game) a virtual puppy in her park. She transmits it to Drew, possibly getting a different virtual item or a credit payment in some currency. Drew takes himself and his mobile device (on which appears the virtual puppy) to a "kennel". This can be a container dressed up as a kennel. Drew uses his device to put the kennel in focus. This can be done in various ways. One is for the game to use his device's ability to know its location and orientation ("compass"). Drew brings the device close to the kennel and points the camera at the kennel. The game uses the location and orientation to indicate by some graphical or audio means that the device is focused on the kennel. For example, it could highlight the kennel in the image. The game transfers the virtual puppy to the kennel. In programming terms, the game can put an id corresponding to the virtual puppy in the memory area associated with the kennel object in park 100. The kennel has a physical door that opens. It shows a physical toy puppy which Drew can take and keep.

One possibly asymmetry between the parks is that park 100 might have the kennel while park 200 does not. Park 200 could have an equivalent container for releasing physical toy instances of monsters that Sue can get.

Thus far the examples are been of cooperative behavior between members of a team in different parks. A different example is antagonistic behavior between members of different teams. Suppose Drew is in one team and he has members in park 200. Now Sue is not on his team. She might want to hinder Drew's progress in getting clues and prizes in park 100. Drew approaches door 108. It is open. He sees via his device screen an image of a virtual prize inside the entrance. But Sue has been (remotely) monitoring door 108. She wants to deny the prize to Drew. Earlier, she obtained the ability in her wanderings to close and lock various doors in park 100, including door 108. She closes and locks door 108 before Drew gets to it. He cannot unlock the door. It can be seen that the ability to remotely close and lock a door is easily doable with current technology. Park 100 has done this for door 108 and promulgated the ability to players in page 200.

Sue's antagonistic behavior can arise if the game has a common deadline (or equivalent feature like having the highest score) for teams in both parks to finish their tasks. It is not enough for Sue's team in park 200 to be the first team to finish in that park, or to have the highest score for getting prizes in that park. Her team should also be the highest across both parks. She has to delay or prevent teams in other parks from getting clues or prizes.

3] Two Theme Parks: Visitor-Visitor-Viewer;

This section describes a visitor in one park interacting with a visitor in another park and a (remote) viewer. See FIG. 2. The viewer is Laura 110, interacting with Drew 100. Ignore Mike 203. Laura can be anywhere in the world that has Internet access. She has a mobile device 111, like a cellphone. On her device she is running a game app. This game is likely written by the parks. Her game app is also likely not the same as the game apps used by the visitors. By not being in a park, she has a different experience. Crucially she is unlikely to be able to control nearby electromechanical devices via her device, or to have such devices near her being controlled by other viewers or visitors (in the parks).

Figure 3:
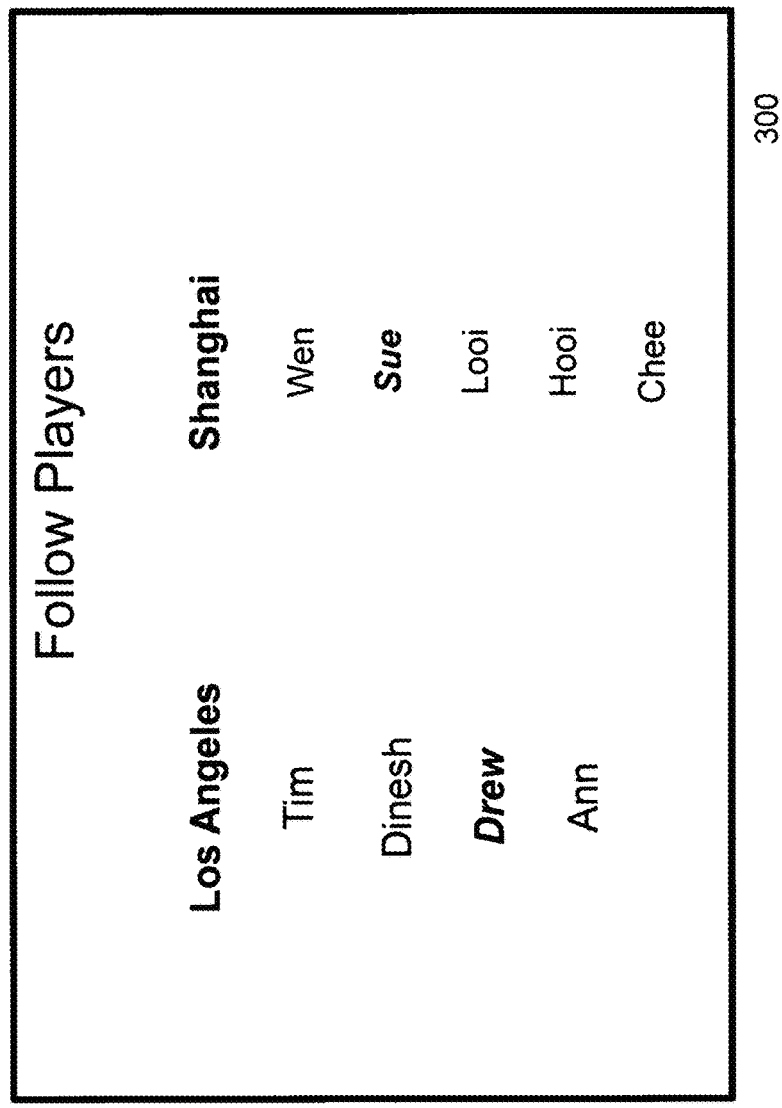
FIG. 3 is a screen of players to follow, shown to a viewer.

One case is where Laura is passive. She is not part of Drew's team but a spectator. Her interaction is limited to (perhaps) being able to send messages to Drew and to tip him by donating money or some game currency to him via her game instance. She represents the esports audience. She can follow activity in park 100. Depending on the game, she might also be able to follow activity in park 200. For park 100, she can follow Drew as he moves thru the park. The game could also let her follow other players. This can be done by her manually controlling the actions on her screen to move thru the park and try to manually identify a specific player. Like current sports TV. But because all players have a mobile device with a game instance for that player, the game can easily track the players. It can present her with a screen. See FIG. 3. Item 300 is a screen in her game, listing players in both parks. Drew and Sue are indicated in bold and italic, to mean that Laura picked them. The game can automatically follow them. It can show the environment around each. Perhaps as actual video or photos taken from cameras in the park. Or perhaps as symbols on a screen, with other symbols designating clues, prizes or obstacles. The game could also show images from the cameras of the visitors, or images from the screens of the visitors' devices. The latter images can be quite different from the real world images. The game is showing virtual items on the visitors' screen to enhance their experiences. When a viewer can see this, it does likewise for her.

A variant is where Laura can only follow players in 1 park. So FIG. 3 might only show Drew chosen by her.

Suppose Laura is actively involved in the game. One way is that she is on Drew's team. She can be in a scavenger hunt outside the parks, in an AR-type game. So the overall game splits into at least 2 versions—in and outside the parks.

If Laura only follows Drew, and is in his team, and he is teamed with Sue—then if she needs some virtual items, she can ask Drew. In turn he can convey this to Laura. In her game outside the parks, she can look for the items needed by Sue. If she gets these, she can send them to Drew, who sends them to Sue. This presupposes that the game prohibits direct communication between Laura and Sue.

The inclusion of players in 2 (or more) theme parks and an active viewer makes for more gaming possibilities. The needs of 2 visitors for virtual items increases the chances that when Laura plays her game, she is more likely to find those items. From a gaming standpoint, if she can get more items, it can lead to greater satisfaction for her, and increases the chances that she will play, and play longer, and play again at a later time.

Or the winning of an overall game could depend on finding virtual items in both theme parks and in the outside game played by Laura. The items would be made to be different, to ensure the need for players in all 3 environments.

A variant is where Laura's remote activity in park 100 is needed by Drew. Her screen shows virtual items, prizes, obstacles or monsters in park 100 that Drew cannot see on his screen (perhaps until it is too late). Drew needs Laura to scan or search park 100, maybe around him. If Sue is on Drew's team, the game might not let her do this. Or perhaps Sue can in her game only see certain virtual objects in park 100, while Laura's game lets her see others. This is a means of game design to encourage participation across difference regions.

A variant is where the game is designed so that certain electromechanical devices in park 100 need to be controlled by Laura, so that Drew can win virtual or real items. There might be a real box containing a real teddy bear. He needs the bear. But the box can only be unlocked by the viewer Laura, not Drew or Sue.

There could be real boxes with multi virtual keys needed. Such a box needs a virtual key found in park 200 and a virtual key found outside the parks. This latter case of a key outside the parks can be elaborated. Suppose active viewers are taking part in scavenger hunts outside the parks. The specific virtual key for the box (which could be real or virtual) in park 100 might be found only in, say, Canada. So Drew has to persuade a Canadian viewer to join his team. It is a simple matter in the design and running of the scavenger hunts outside the parks for items or prizes to be distributed in part by a geographic or national basis.

A variant is where viewer Laura can only do a finite number of controllings of electromechanical devices in the parks. Suppose she can "see" both parks. She helps both Drew and Sue. But she can only control (one at a time) a maximum of 3 devices. The problem is that Drew needs, say, 2 boxes opened. There are real or virtual items in those he may need. But some might be useless or worth little. He does not know what they are and how much they might be worth in the game. Likewise for Sue in park 200. They have to decide which 3 boxes to open, based perhaps on other information about the suspected contents of the boxes. This deliberate game design of a constraint encourages teamwork.

A common theme is that game design can extend the usual benefit of a team sport. Often a team in real or virtual space has all or most members near each other. Now the team is dispersed in real space.

4] Two Theme Parks: Visitor-Visitor-2 Viewers;

See FIG. 2. Now suppose Laura is following Drew and Mike is following Sue.

The first case is where Laura and Mike are near each other. They are taking part in the same scavenger hunt organized by the parks, in an area outside the parks. Suppose they form a team for that game. Either by a game requirement or by choice, Laura decided to follow a visitor in park 100, Drew. And Mike decided to follow a visitor in park 200, Sue. Or the game automatically assigned them Drew and Sue. Laura and Mike working in a team outside can let them capture items that an individual could not. Imagine a game where the "weapons" of 2 players are needed to defeat a given "senior" monster and capture it or a prize it was defending. The point is that the viewers do a cooperative behavior to garner a result that a single viewer is unlikely to get.

This item can be sent (or traded) with Drew or Sue. Which to pick can be left to the game. If Drew and Sue were automatically assigned to Laura and Mike, it could be because Drew and Sue each needed an item of a certain level or seniority, and the game found that a team of viewers was playing in a region where they could capture such items. Or, if Drew and Sue picked the visitors, it might be before or after they captured the senior item. The game could give a search function to them, to look for visitors needing such an item.

Suppose Laura and Mike sent or traded their senior prize to Drew and he uses it, while Sue still needs such a prize. One case is where Laura and Mike can go searching around themselves again, to capture a similar prize and send it to Sue. Another case is where when Drew uses the prize, perhaps to get another clue, the prize can be sent to Sue.

Above, we described Laura and Mike picking visitors to team with. The opposite is possible. Suppose Laura and Mike formed a team. They indicate this to the game. Then when Drew started looking for a team, he could search in the game for viewers, single or already in a team. Various criteria might be possible to search for, and he found and picked Laura and Mike.

Now suppose Laura and Mike are not near each other. They might be playing in different regions or countries. When visitor Drew plays, the game might need him to recruit a viewer in, say, Japan. He searches in the game and finds Laura. Likewise, Sue, who is not currently in any team, might need a teammate in Australia. She searches in the game and finds Mike. Then by various means and criteria, Drew and Sue merge their teams. One criterion might be that the overall game wants an international cast in a top or winning team. It might not be mandatory, but it could help. Thus a team from China, US, Japan and Australia is made.

If Laura and Mike are in different regions, they might want to be on the same team because one criterion for their game is that each find another (active) viewer (player) in a given region. So Laura in Japan is told that she needs a viewer in Australia. Mike need not necessarily have the opposite requirement. He might face no regional constraint in what team he is in. The main aspect here is that Laura's game does not let her simply search for viewers in Australia. She has to join with a visitor at a park. This could be to encourage teams to have visitors. It plays to a value add of the theme park. The remotely controllable devices it has lends to a more real playing experience, compared to a game purely played on electronic screens. This also applies to viewers like Laura. Though she cannot physically see the changes she makes to park machines, simply by being told of it from teammates and from seeing images, video and audio, it enhances the reality of the game for her.

5] Night and Day, Summer and Winter;

Suppose there are at least 2 theme parks involved in the interactions. One park is currently in daytime, the other is in nighttime. This can be used to play a combined game with a common theme, that uses the outdoors of the parks and the day and night. The game can also use the indoors of buildings in the parks.

An example is a horror theme. Park A is in night time. There are virtual monsters in the outside: vampires. Players have to dodge them or capture them. Meanwhile Park B is in daylight. The outdoor monsters are zombies. Players in different parks can pass clues and items to each other. This offers a simulcast total game to viewers. It uses the trope of vampires being unable to be outdoors in daylight.

In this example there might be several "innings". One inning can be the previous case. The next inning can be a day or so later, when park A is in daylight and park B is in night time. To reduce any possible disadvantage (perceived or otherwise) when just playing in daylight or night time.

Night time play in a park can also be useful if it occurs when the park is normally closed. All non-playing visitors can be absent and the entire park is available exclusively for the game. This is a time when the park is normally not generating revenue. Now audiences may be awake in other parts of the world, providing incentive for such play.

Another scenario is two theme parks, both in daylight or night time. One park is in the summer time, the other in winter. Imagine one park in Los Angeles in summer while the other is in Santiago Chile in winter. The different weather conditions allow for gameplay catering to these conditions.

A third scenario is two theme parks, one in daylight and the other at night, where one park is in summer and the other in winter. Imagine one park in Los Angeles in a summer daytime, and the other park in Sydney in a winter night time.

Note that this section does not need the remote audience of viewers or that the visitors can manipulate the electro-mechanical devices in the parks. Though both aspects are possible.

6] Handoff from 1 Theme Park to Another;

Thus far we considered both theme parks to be open at the same time. A different case is when the game ends in one park perhaps because the park is closing for the day. The game will continue in the other park. A team active in the first park can handoff its position to other team members in the second park.

See FIG. 2. Suppose at a given time park 200 in Shanghai is open and now it will close for the day. The team consists of the 4 members shown in FIG. 2. When park 200 was open, the game was only happening in park 200, and the team's members Sue and Mike were active. The team has some assets. Largely these can be virtual. Though there is a case where some assets can be real. Perhaps a computer chip or thumb drive with some data. Perhaps a real teddy bear. We assume that any real assets are held by Sue in park 200.

The virtual assets can be stored in the game server's computer, in the team's account. Some real assets can be effectively transferred from park 200 to park 100. These assets in park 200 can be stored in some escrow facility controlled by the park. Copies of the assets can be made or put into another escrow facility in park 100. For a thumb drive or other computer media, the data can be copied from the device in park 200 to an equivalent device in park 100. A teddy bear in park 200 can be equated to a teddy bear in park 100. It may be a rule of the game that, say, a visitor must walk around the park carrying a teddy bear. The parks can ensure that real items like teddy bears have copies in both parks. This is possible because the real items are found or made in the parks. It is not recommended that the real items are arbitrary items brought into the park by the visitors.

When the team starts up in park 100, park 200 is assumed to be closed, or at least that the team's members in park 200 (Sue) or associated with park 200 (Mike) are no longer playing. Drew goes to the escrow facility to physically check out the items from Shanghai. He and Laura have their virtual items from Shanghai. The latter can be associated with the team as a whole. For example, "gold" coins or "health" potions or a "scroll" of wisdom. In this case, if Drew had viewers Laura and Tim (not shown in FIG. 2), then there is no problem about item distribution amongst the team.

But if some virtual items are associated with one viewer and now there are 2 viewers, the issue is how to distribute these items between the viewers for Los Angeles. We leave this to the details of specific games, simply specifying here that such issues could arise.

One answer is important and simple to describe. The team members for Los Angeles have leeway to redistribute the virtual items as they see fit, amongst members who will be active. But there may be games that prohibit this. For example, a game could require that a viewer have at least 1 health potion. If Shanghai hands over 1 health potion and there are 2 viewers for Los Angeles, 1 viewer will not be in compliance. In turn, a simple answer is that 1 viewer (Tim?) will not be active in that round. Hopefully in future rounds, there will be enough health potions to let Tim play.

A related issue is where some virtual items are associated with one visitor in Shanghai and now there might be 3 visitors in Los Angeles. This can also apply to the real items put into escrow.

Another use of hand off is for a relay type game. A team could have a subset of visitor members in the Los Angeles park. The game ends (for today) when the park closes. The team has other visitor members in the Shanghai park. These members carry on the game, perhaps against other teams similarly distributed across the parks. Within the game, each team could have a virtual item that acts as a baton, passed from members in 1 park to members in another. The baton could be tangible, using fabricator machines emplaced in each park. So when the Shanghai team enters the park to start their play, they can go first to the fabricator and pick up a copy of the baton. A member can then carry this thru the park when they are playing. Of course, the baton is instantiated in any tangible form that can be replicated in a fabricator. As a matter of game play, the tangible baton can be suggested, to make the game more than just a game played on a computer screen. It plays to the tangible nature of the park.

Figure 4:
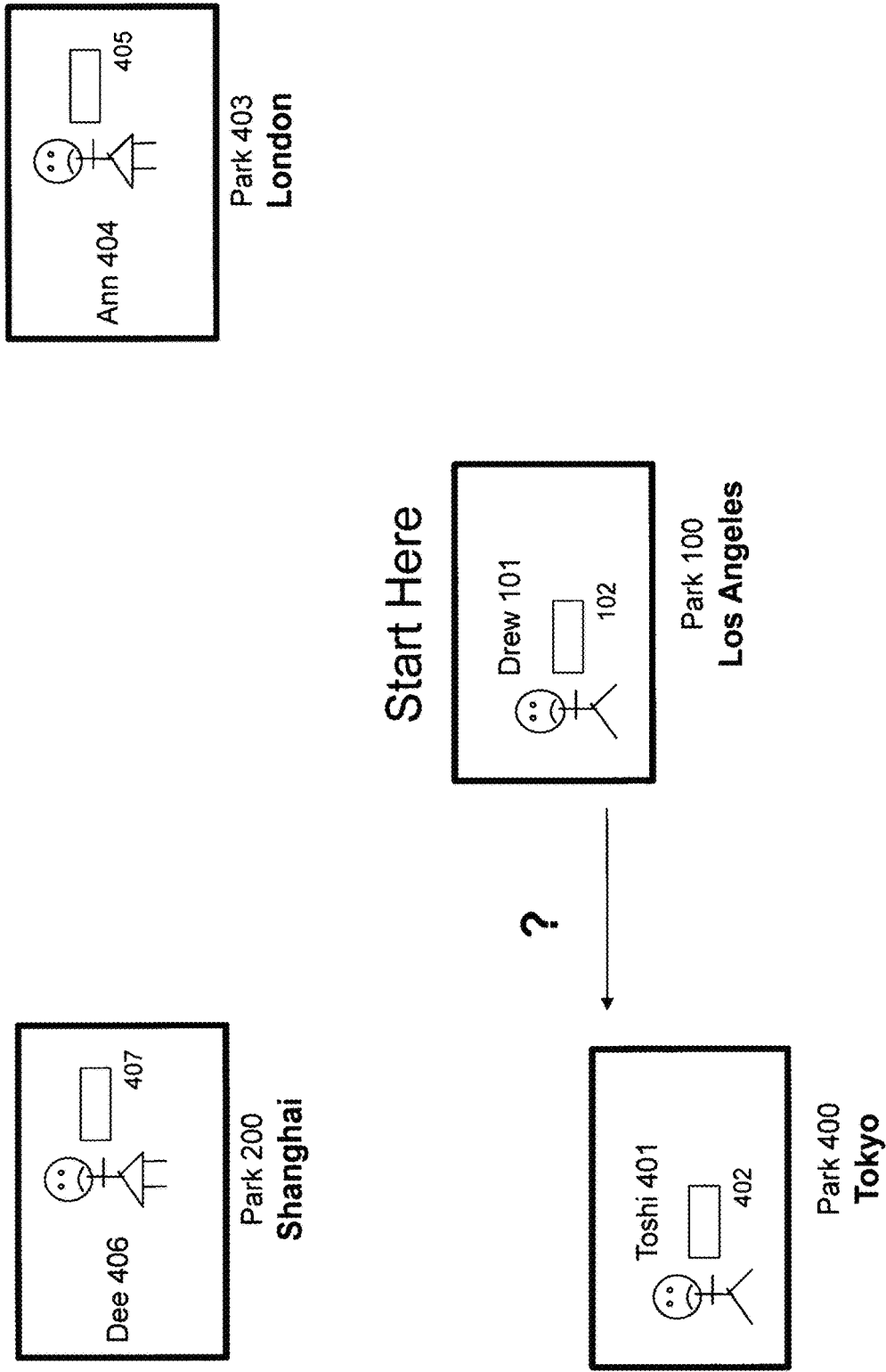
FIG. 4 is 4 theme parks with a game starting in Los Angeles.

7] Picking a 2nd Theme Park;

Suppose a game is initially played in only 1 theme park. It is popular enough that it is desired by the parks or perhaps by the players to increase the game board (so to speak) to other theme parks. See FIG. 4. The game is currently played only in Los Angeles park 100. It shows 1 visitor Drew 101 and his mobile device 102. In general there will be other visitor players in park 100. For simplicity viewers like Laura 110 from FIG. 1 are omitted here. But they are also assumed to exist.

There are 3 other parks shown. Shanghai, Tokyo and London. All 4 are part of a firm. Each park is shown with 1 visitor. This single visitor represents 1 or more visitors present in that park. Note that park 200 is shown with a visitor Dee 406 and her mobile device 407. Currently the game is not being played in park 200. Visitor Sue 201 in FIG. 2 does not (yet) exist in FIG. 4. The firm would like more game play.

The first issue is how does the firm detect or define a market demand to spread the use of the game to other parks? The second issue is how to pick other parks? Note that the spread of the game is taken to mean growing the current instance of the game, as opposed to running new independent instances. Call the game Alpha. Other parks might be running other games, just not Alpha. The arrow with a question mark from park 100 to park 400 is meant to suggest perhaps picking the Tokyo park based on some criteria.

Figure 5:
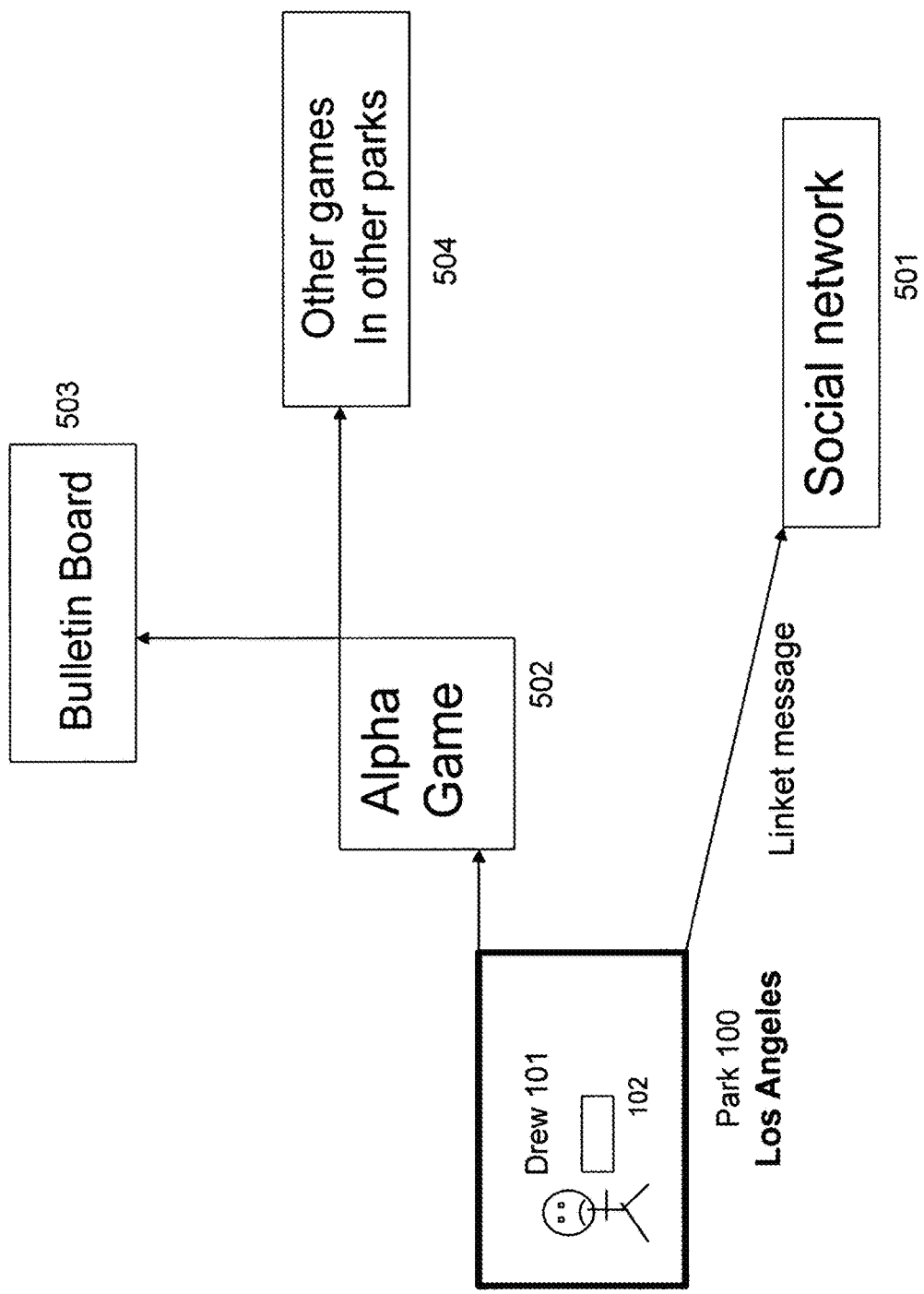
FIG. 5 is a visitor sending a message to visitors in other parks.

See FIG. 5. Drew sends a message to others in his social network 501 who are gamers. The social network in general has servers, websites and apps independent of the firm. The message can say that if they are in other theme parks of the firm, to click a link in the message. This can lead, after a few more clicks, to the installing of Alpha on their mobile devices, with their permission, and if Alpha is not already present. It can also cause Alpha to be automatically run, and their instance of Alpha can interact with Drew's instance. (This method can also be done for visitors in park 100, to help increase the use of Alpha in park 100.) In an earlier U.S. Pat. No. 9,792,101 we described this, with the link containing a Linket™, an example of which could be [Drew Gamer]. The square brackets are simply a choice of delimiters.

An advantage of using the linket is that it avoids 2 manual searches. Of the app store for Alpha app. And within Alpha, for Drew. If there are many gamers currently running Alpha, there can be a long list and scrolling thru it to find Drew can be tedious and error prone. This is also true of the manual search of the app store for Alpha.

Another method avoids linkets. Other parks could have visitors playing other games. The games are likely all written or vetted by the firm, because these can control the electromechanical devices in the parks. Drew sends a message in Alpha 502 to people 504 he played with in other games in the past, telling them to run Alpha. This message can have a link autogenerated by the firm, pointing to a server run by the firm, from which they can download Alpha. A boon to the firm for it avoids the firm paying fees to the app store. Or Drew can send a message to be shown in a bulletin board 503 run by the firm, accessible in those other games. This message is a broadcast to people he does not know.

Previous methods let customers in other parks boot up Alpha and extend the game board themselves. This assumes that if a user runs Alpha and Alpha detects (thru geolocation perhaps) that it is in a theme park of the firm, then the game can be played. A different method is where the firm has to approve the use of a park for Alpha to played in it. Consider where Ann 404 in London got a message from Drew or read it on a board, and she installed Alpha. Her Alpha sees it is not in Los Angeles, which currently is the only approved park to run the park. It tells the server that a user wants to run Alpha in London. It also tells her that this is under review. The server collates requests over a period of time. It could have a threshold above which it auto-approves the game for London.

Or the server could have tests that it applies to a park to approve it for Alpha. One test has to do with the status of various electromechanical devices to be used in Alpha. Some of these might be under maintenance at a given time. If these are considered essential for a good experience of game play, then the firm could prevent Alpha from being run in that park until the devices are available online. Approval can also be a function of the number of people in the park and of the number of players who signed up to ask for Alpha to be run in the park. There could be tests to anticipate given either or both numbers, whether the expected game use has enough operational devices.

Related to this is the possibility that other games (Beta, Gamma, ...) are currently being played in the other parks, and these games avail themselves of the electromechanical devices in those parks. This can be a factor in deciding whether there is enough spare capacity in the parks to extend Alpha to them.

Concerning the number of people in the park, too many could be detrimental to some games that are scavenger hunt-like in the open areas of the park. It can be clumsy for players to move near and around non-players. It can be that, for example, during a public holiday where many more visitors are expected, for the firm to deprecate the playing of some games at a park in that nation.

There could be various other tests for approval. Several are listed below, but are not intended to be exhaustive.

One. The weather in the park. The park might still be open, but heavy rain or hail, say, could lessen an outdoor experience, if Alpha has outdoor game play. Or even indoor experiences, if users have to traverse the outdoors.

Two. The time remaining in the park till closure, assuming players of Alpha would not be allowed in the park after closure. Earlier we wrote of a park being used after hours for gaming. But that does not have to be for every game. If the park would close in an hour, this could be judged as insufficient time for a good game experience with Alpha.

Three. The time remaining for daylight, if Alpha is meant to be played outdoors during daytime, even if the park continues to be open after sunset. If Alpha is mostly or entirely played indoors or if Alpha can be played at night, this test can be skipped.

Four. The time remaining before an eclipse starts or before it ends. For a game very focused on outdoor game play before or during the eclipse. For games that do not use an eclipse, this test would be skipped.

Five. The time remaining before fireworks start or before they end. For a game that uses play before or during fireworks.

Six. The time remaining before a parade starts or before it ends. For a game that uses play before or during the parade.

Figure 6:
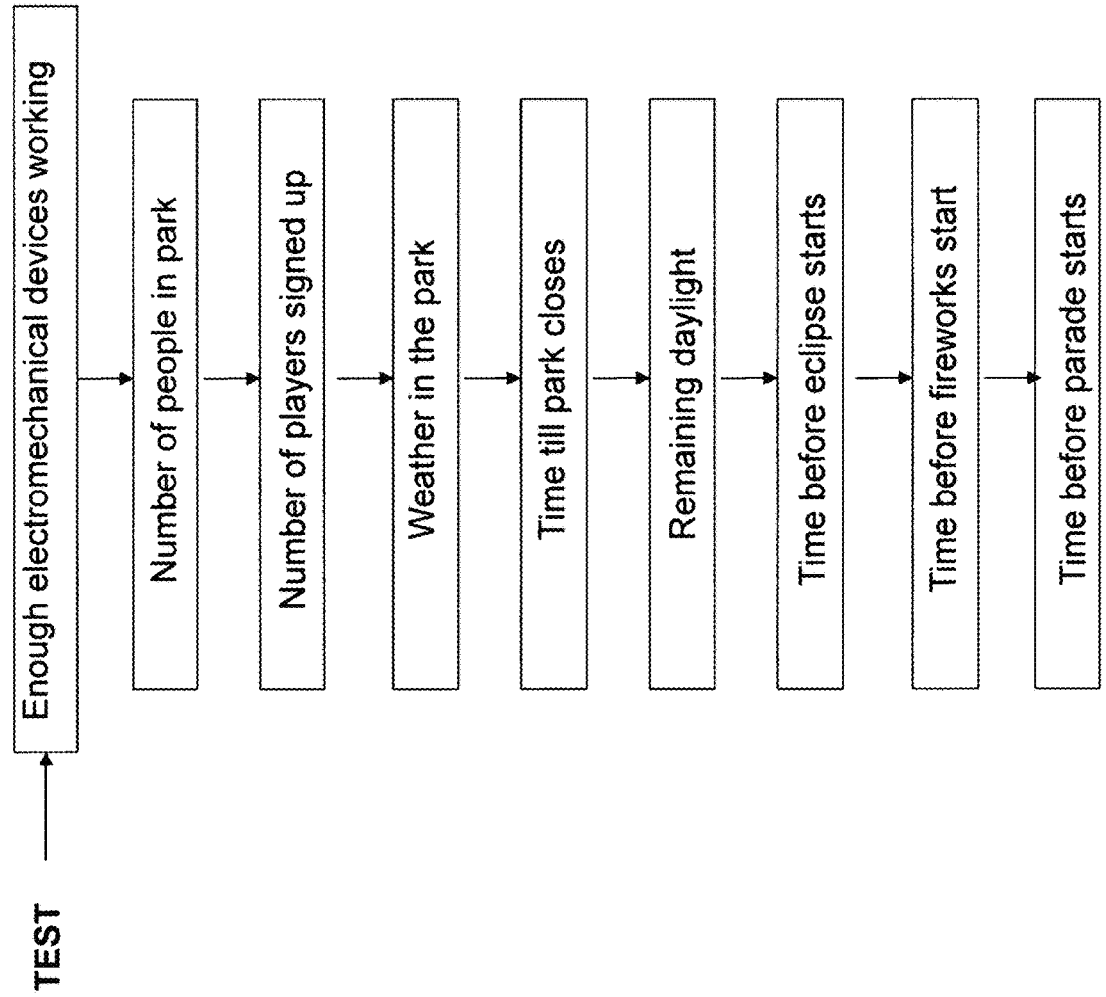
FIG. 6 is a flow chart to test if a game is to be played in a park.

FIG. 6 summarises several of the above tests in a flow chart.

Above was described how a gamer Drew in a park can send messages to others, or to a bulletin board for another park. The firm itself can write messages to the board, in addition to letting garners do so. All messages to a board for a given park can first be filtered by the above tests about whether to open a game for a park. If the tests say no, then the message will not be shown on the board, to prevent an unnecessary case of users in that park reading it, clicking yes, and then having their request denied.

While this section has concerned itself with how to go from a game played in 1 theme park to a second park, much of the methods clearly apply if, say, the game is played in 2 parks and should be extended to a third or more park.

Also, the above was for games where a team could have visitor members in several parks.

But it also applies to where some or all teams have visitor members in the same park.

Figure 7:
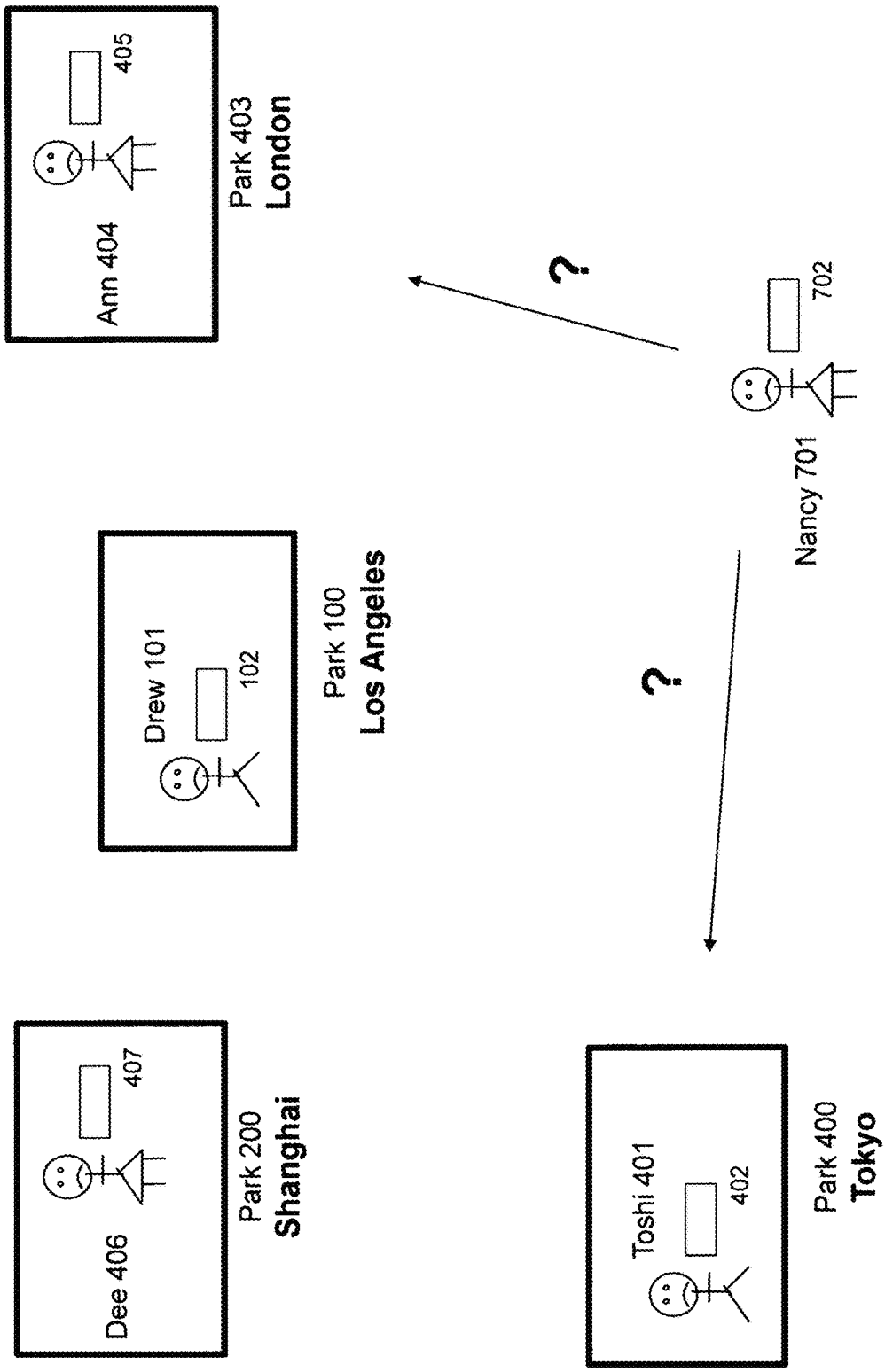
FIG. 7 shows a viewer trying to pick a park and a game to follow.

8] Guiding a Viewer to a Team;

Suppose a game is being played in several parks. FIG. 7 shows the game in 4 parks. A viewer Nancy 701 uses a viewing app for the parks. This can be for her mobile device 702 or for a non-mobile device (not shown). The latter is possible because since she is remote, she might be sitting at a desk by a PC or laptop or other such device, whereas visitors to the park are mobile in the park and likely to be able to carry only lightweight mobile devices. The app is connected to the game server (or servers), so it has access to data about the players.

There might be hundreds of visitor players active at this moment. Who should Nancy watch?

Assume for simplicity that there are no other games being played in the parks. The viewing app, which is equivalent to the game, can recommend to Nancy which team or player within a team to follow. Of course, the game can simply show symbols for all 4 parks and let her pick a park and thence show the teams in that park, so that she can pick one (or more) to follow. Different teams or players can have different numbers of viewers who are just passively watching. The app can show the teams/players with the most such followers by default.

If Nancy has previously followed any of the current players, then the game can have an option to show these, letting her pick between them.

Or the app can make suggestions based on other data.

One possibility is to use any knowledge the game has of Nancy's language or location. If she is coming from a network address in China, it might suggest following Dee 406 in Shanghai. (Ignore for the moment that Dee's other team members could be in other parks.) This also has the advantage of minimizing latency between Nancy and Dee. But the game can go beyond a simple use of mapping a network or physical location to a language. Existing teams can message each other in the visitor app. Likewise they are likely also can get and send messages to viewers who are part of the team, and viewers who are passive watchers. The messages can be in various languages. There can be a hierarchy of languages for a given team, based on a hierarchy of messages.

Figure 8:
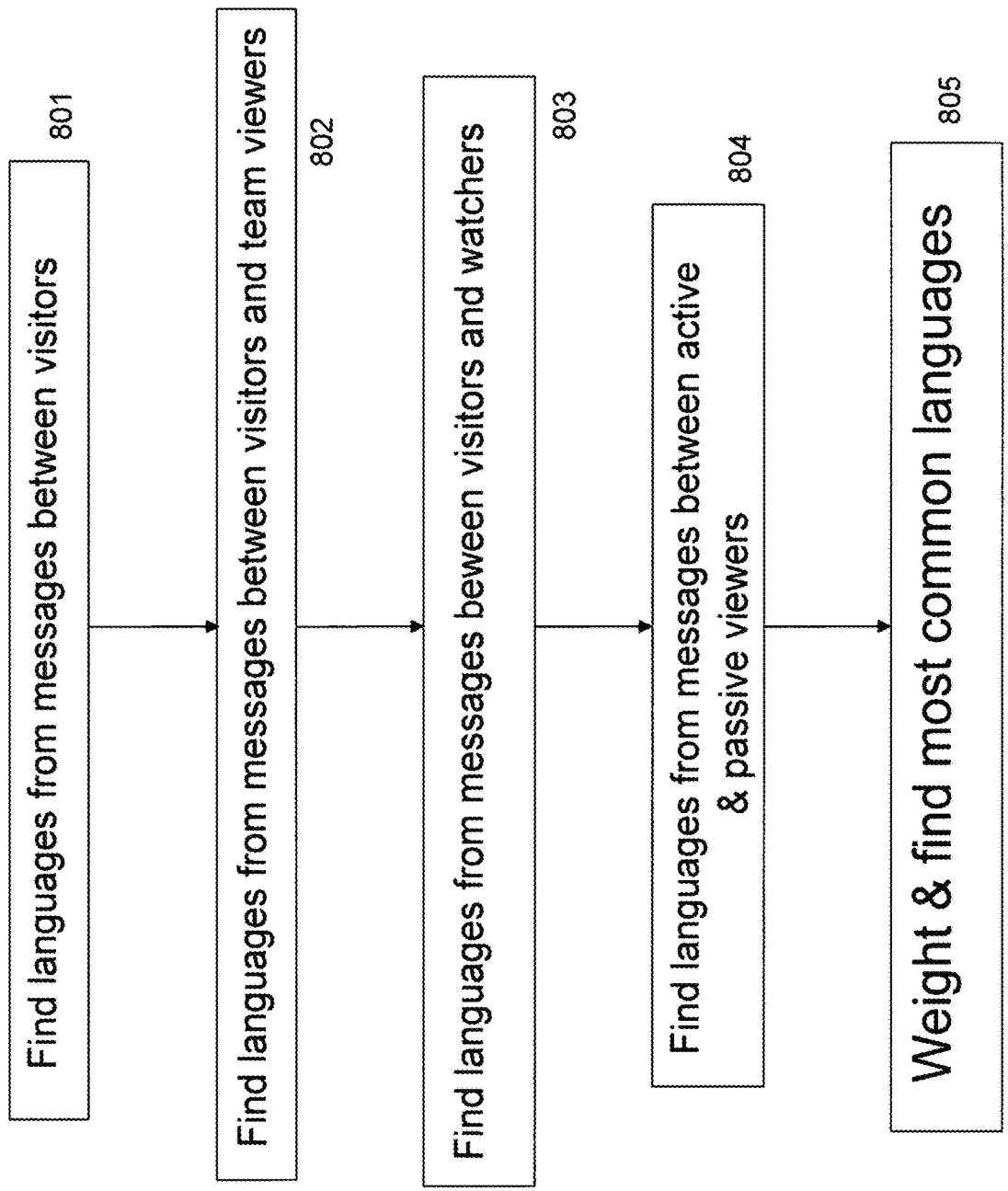
FIG. 8 is a flow chart of finding the preferred languages that a team uses.

FIG. 8 is a flow chart of how to find the most common languages that a team uses. The most important messages are those going between team members who are visitors; ie. actually present in the parks. See item 801.

The second most important messages are those between visitors and viewers who are part of the team. See item 802.

The third most important messages are those between visitors and watchers (passive viewers). See item 803.

The fourth most important messages are those between active viewers and passive viewers. See item 804.

In some implementations of deciding the language, the third and fourth categories might be merged into one.

Item 805 depicts how the numbers of each language in the earlier steps might be weighted and then summed to find, say, the top 3 languages used by the team. The weights could be chosen by methods external to this submission. Perhaps by AI or some neural network. All the steps in FIG. 8 are with respect to a team.

Suppose for a given team its languages are in descending order: Korean, Mandarin and English, with some weights attached to each. And suppose the game knows from Nancy's previous history that her preferred language is Korean. The game does this for all or most of the teams. For Nancy, it can then default to showing teams who mostly use Korean, which would include that example team.

It encourages Nancy to interact easily with teams, increasing the chance that she will spend more time watching the game.

One variant is where a team tells the game that it prefers to interact with watchers in a given language. It might assign one of its members to message watchers in that language, for example. The game can choose to ignore FIG. 8 and use the team's suggested language. Watchers are vital, because ultimately they might provide much or most of the revenue for the game.

A variant is where the game knows that Nancy tends to tip teams that she messages in, say, Vietnamese. A team could have an option to say that it wants watchers who tip in that language, where presumably at least one of their members can write in that language. This specific request from the team could be the main or only criterion for determining the team's language.

Another issue is where is a team since it can have members in several parks, and its viewer members can be anywhere. It might be expected that most teams will have a geographic preference, and specifically that most teams will have most members in 1 or 2 parks. Thus once teams' languages have been found to include those likely to be favored by Nancy, the game can order the teams in a list presented to her, sorted by, say, proximity of the visitors in the team to her. This does not use the locations of the active viewers in the team. A variant is to also use the locations of the latter in finding an "average" location of the team.

Thus far this section was about a viewer who is passively watching. Another case is where a viewer wants to join a team as an active player. Much of the above discussion about finding the languages of the team apply. The issue above about a team looking for passive viewers known to tip can be germane. Imagine a team with celebrity players who are visitors in the parks. They derive revenue by announcing through the game or externally through social media, that they are willing to have team members who are active viewers. And that one way to do so is to use the tip mechanism (assuming the game has this) to effectively bid to be accepted as an active viewer.

Figure 9:
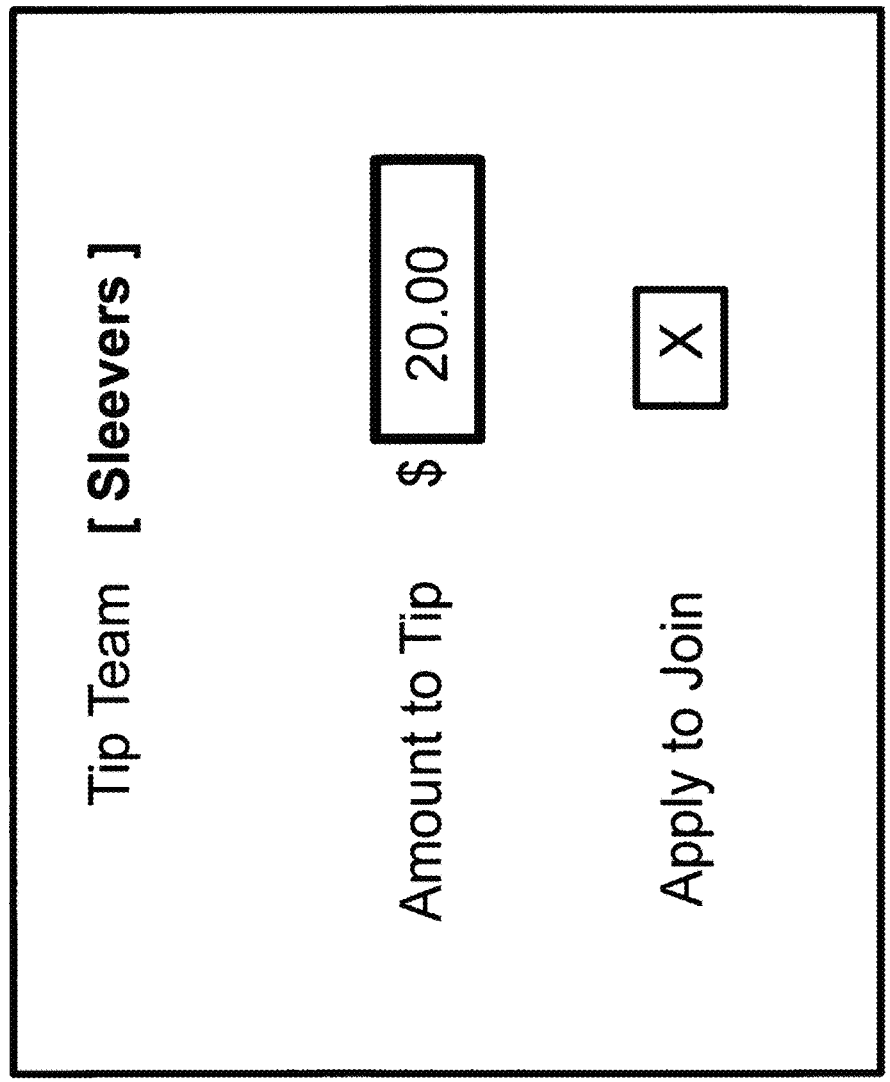
FIG. 9 is a screen of a tip page seen by a viewer.

The game could have a mechanism to let existing team members restrict the number of active viewers in the team, and to pick those by some means from a list of applicants in the game. Those applicants could voluntarily tip the team. A simple case is where the applicants who made the largest tips are accepted into the team, up to some limit of such players. FIG. 9 shows screen 901 seen by a viewer on her computer. It shows the title—where she previously picked a team called Sleevers to tip. There is a box where she can input an amount, shown as $20 here. The example uses dollars. But it could be in any national currency or in an artificial currency used by the game or the firm that runs the theme parks. There is a box filled with an X, which means that she wants to join the team. The context is that she is a viewer, outside the parks.

Implicitly when she brought up screen 901 in her game viewer app, the game server has a record of whether she is already a member of another team. If so, it is likely that the server will not let her join another team. Going further, to reduce cheating, the server could also test if she has been a member of another team, and if so, to not show screen 901. This prevents her from joining that other team and resigning to try to sign up with Sleevers and pass information back to the other team.

Elaborations of screen 901 and the associated game logic are possible. For example, if she picked the box (as shown here), the amount she tipped might be held in escrow by the server. If the team accepts her, the amount is paid to the team. Otherwise the money is returned to her.

Why would viewers pay (tip) to be on the team? Reflected glory. Akin to how in the real world celebrity golfers can make a living by charging people for a game of golf. The average person who pays does not expect to win so much as to have the social experience of interacting with a celebrity.

The team could also specify explicitly that it is looking for an active viewer, who knows a language (or several).

9] Portal Between 2 Theme Parks;

In theoretical physics, a portal (or wormhole) is a postulated connection between 2 locations. The idea has spread to science fiction and movies, making the word a trope or meme. A firm running theme parks can exploit this by having electromechanical devices at each park acting as portals.

Figure 10:
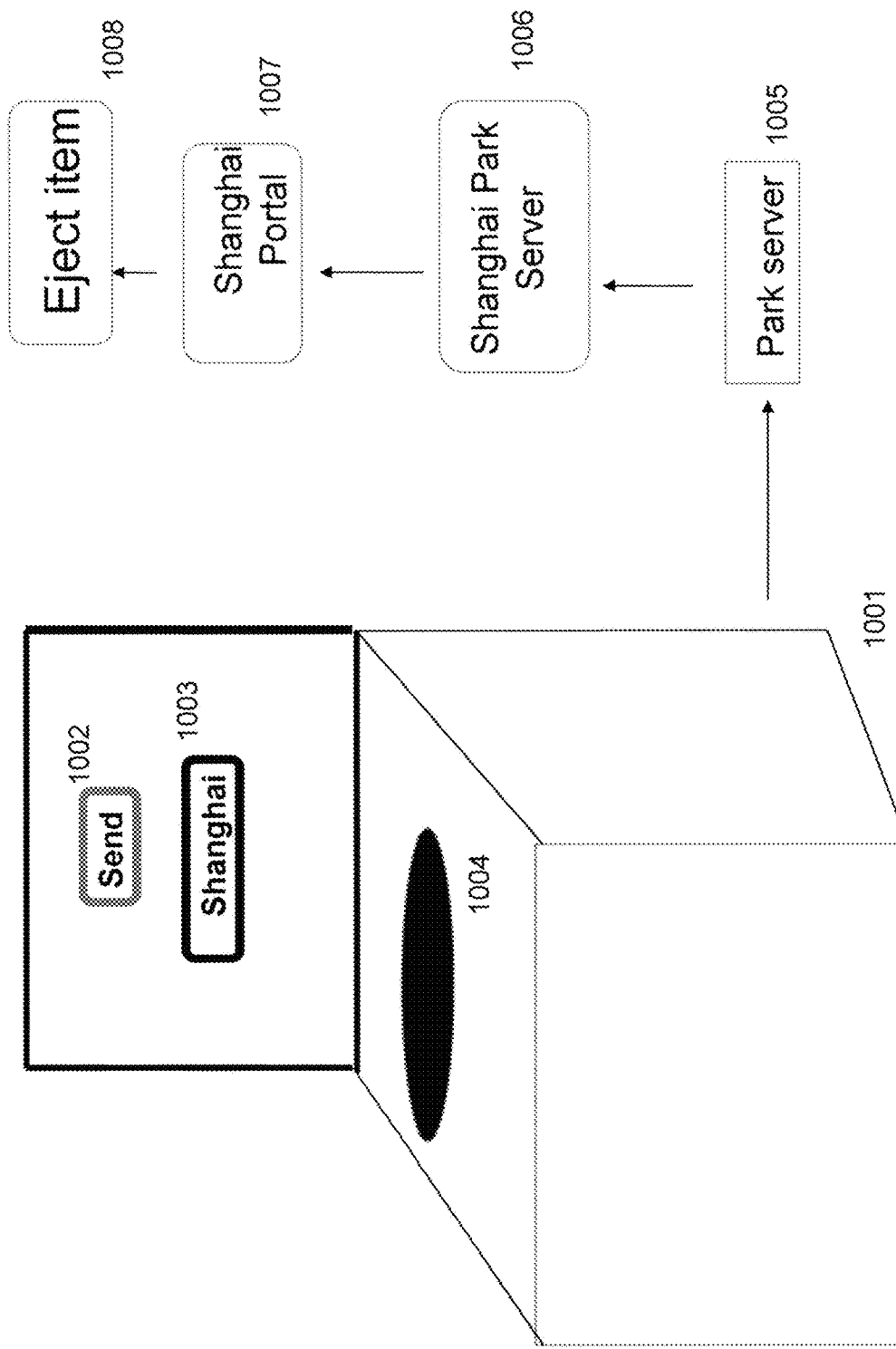
FIG. 10 shows a portal in a park.

The portal can be used to "send" tangible physical items to a portal in another park. These items can be constrained by the parks to be for example plush toys found or captured during a team's activity in a park. See FIG. 10. Item 1001 is a portal device in park 100. It has a control panel with button 1002, send, and button 1003 to designate which other park to send the item to. Here it is depicted as sending to Shanghai park. Item 1004 can be a horizontal circular panel on which a physical item (the toy) is placed. Or 1004 can be a hole into which the item is put. If the former, then when the send is pushed, the item disappears into the bulk of the device.

Button 11003 can be a menu listing other parks. In this example, when send is pressed, suppose a team puts a toy dog Model 15 into the portal. The portal detects the type of item put into it by various means. Since the parks likely decide and provide the items, those can have transponders embedded which indicate what the item is. The portal sends a signal to park server 1005. This analyses and sends a signal to its counterpart, the Shanghai park server 1006 in Shanghai. Between these servers might be other servers, including perhaps a master game server that tracks the state of the game. The Shanghai park server 1006 sends a signal to the park's portal 1007, which ejects toy dog Model 15. This assumes that portal 1007 has sufficient quantities of items on hand to fulfill the action and other similar actions.

There are elaborations on this. First, a park might have several portals. A portal could be dedicated to only send items, and another portal is only for receiving items. A park can have multiple sending portals and multiple receiving portals.

The control panel can let the sender Amy pick a particular receiving portal at the other park. This can be so that she can use the game app to tell a team member in Shanghai which portal to go to. Depending on the game, there might be a means at the Shanghai portal to ensure that whoever gets the item is on her team. At the simplest level, this might be a park employee who is told by the game the name of her team or the name of the team member to give the item to. Or the Shanghai portal could be physically configured so that when the item is visible, it is not yet accessible (eg. behind a glass barrier). Her team member has to do some action with his mobile device so that the barrier will open. One way is that when Amy sent the item, she did some action with her mobile device that indicated that an item is being sent to Shanghai and also provides her team id. Her team member approaches the Shanghai portal, presses a button in his game that gives the team id along with the context that he wants to pick up an item (from Los Angeles). The game server in Shanghai gets this, possibly along with his coordinates showing that he is near the portal. The server tells the portal to release the item.

There are numerous other ways this can be done. A portal might have a method specific to the country or region it is in. For example in China QR codes are heavily used. A Shanghai portal could have a screen showing a QR code. Her team member scans it while running the game. The data decoded is used by his game instance to contact the game server. The latter already knows his team id. And it knows to high confidence that he is near the portal, because he was able to scan the barcode. So it releases the item. The game can periodically vary the data in the barcode, and thus the barcode, to ensure that someone copying the barcode cannot use it later. The variable data in the barcode can be a random value that is used only for this purpose.

The send button in the figure might be omitted. The portal could take a choice of a destination portal as sufficient command to "send" the item to that portal.

Suppose Shanghai park is currently closed. The command to send can be batched so that at some time when Shanghai is open, a copy of the item will appear at the portal for her team member to pick up.

In one mode of game play, it could suffice that the player in Los Angeles merely send the item to another specific park, without necessarily needing a team member to pick it up there. Imagine a plot where an item is a "hot potato"—an undesirable item that should be evicted to another place promptly.

The physical nature of the interaction steps in sending the item thru the portal can help enhance the overall experience. This includes having the player press physical keys in a control panel of the portal, as opposed to pressing virtual keys on his mobile device screen.

The portals can have audio and video embellishments to enhance game play. A portal could require extra steps for the user to do in order to send or get an item.

A portal for sending can do double duty by also permitting sending for virtual items held by a team in the park. While the game can be written so that the virtual items could be sent just in the player's mobile device, having the method to sending the virtual items conform to some physical steps, at a physical portal device can also improve the game play.

Above we described a portal sending 1 item thru a portal and 1 copy of it appears at another portal. There are other templates.

9.1] Multiplier (Fan Out);

A player sends 1 item to a portal, 2 copies of the item emerge. This has the subcases of:

A] the 2 items emerge at the same portal in another park.
B] the items emerge at different portals in the other park.
C] 1 item emerges at 1 park, another emerges at a different park.

This can obviously be generalised to more than 2 copies.

9.2] Deleter;

A player sends 1 item into a portal. Nothing emerges at the destination.

A] The original item is returned at the sending portal.
B] The original item is not returned.

9.3] Transformer;

A player sends 1 item. An item of a different type or identification emerges at another portal. For example, she sends a toy puppy. A toy giraffe emerges elsewhere. Here the choice of different type is made by the sender.

This has important subcases.

A] Aging. A player sends a toy puppy. A toy adult dog emerges at another portal. Restated, the input is an item representing an organism of a given species and young. The output is an item of the same species and older.
B] Fountain of youth. A player sends a toy cat. A toy kitten merges elsewhere.
C] Gender change. A player sends a toy lioness. A toy lion emerges at another portal. Restated—the input is an item representing an organism of a given species and gender. The output is an item representing an organism of the same species but different gender.
D] Occupation change. The input can be a toy of a male firefighter. The output can be a toy of a male police officer. Restated, the input is an item representing a person in a first profession. The output is an item representing a person in a second profession.

The gender change can be combined with the aging or fountain of youth. For example, a toy girl can be input and a man can be output from the destination portal.

9.4] Randomiser;

A player sends an item. A different randomly chosen item appears at another portal. The 'chosen' refers to the game server doing the (random) picking.

9.5] Merger (Fan in);

Two items go into portals, 1 emerges at a portal.
A] The input items go to the same portal.
B] The input items go to different portals in the same park.
C] The input items go to portals in different parks.
D] The item that emerges does so at an input portal.
E] The item that emerges does so at a portal different from the input portals.

The above choices fall into 2 groups. A, B and C are one group. D and E are another.

With the above templates, what control the sender or more broadly her team has over where an item can appear and what form it takes is function of the rules of a given game.

Figure 11:
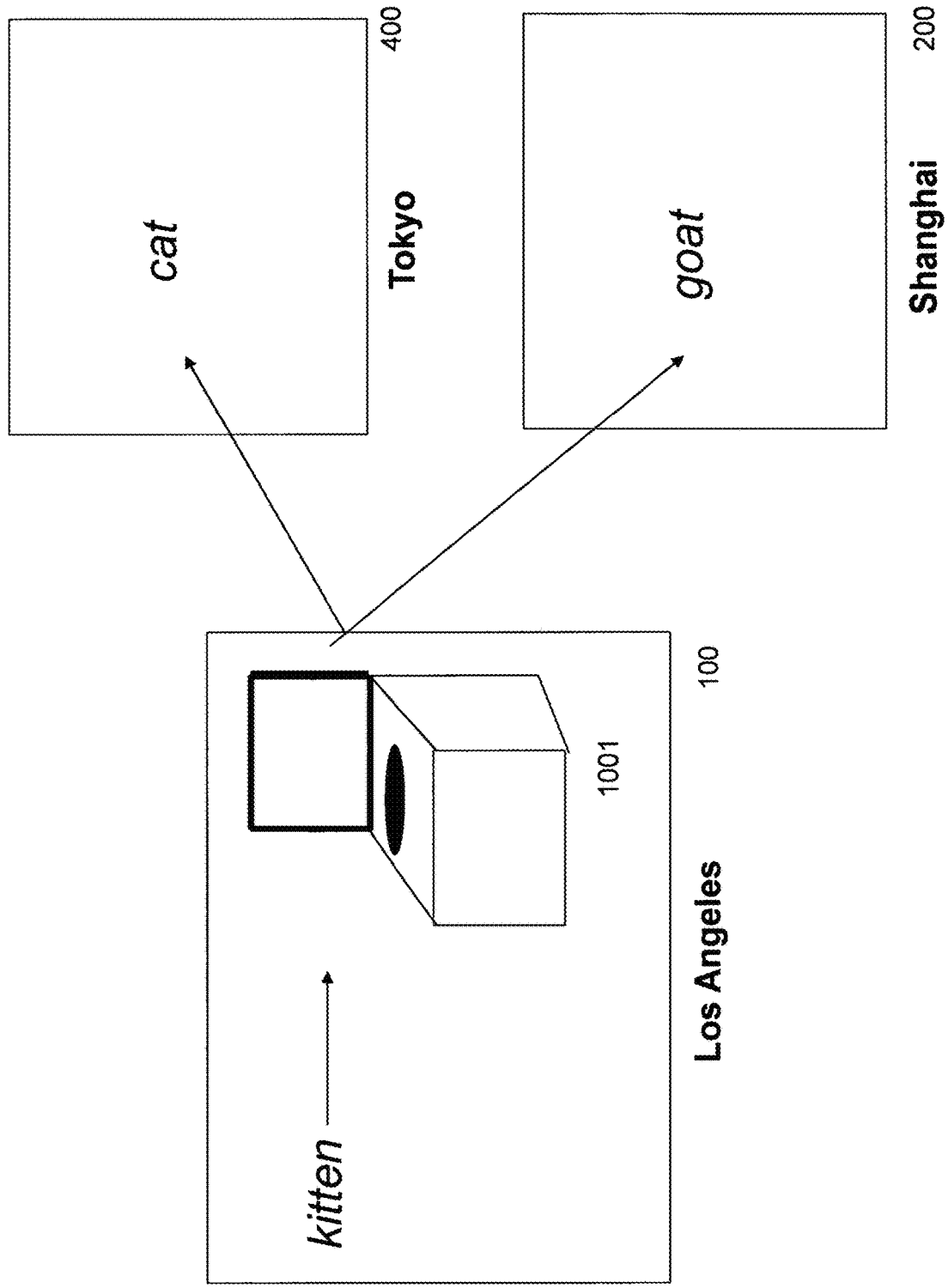
FIG. 11 shows a Multiplier and Transformer use of portals.

These variants can be combined to add to the game play. FIG. 11 shows a kitten going into a portal in Los Angeles (item 100) and emerging at a cat in Tokyo (item 400) and as a goat in Shanghai (item 200). A combination of Multiplier and Transformer.

Figure 12:
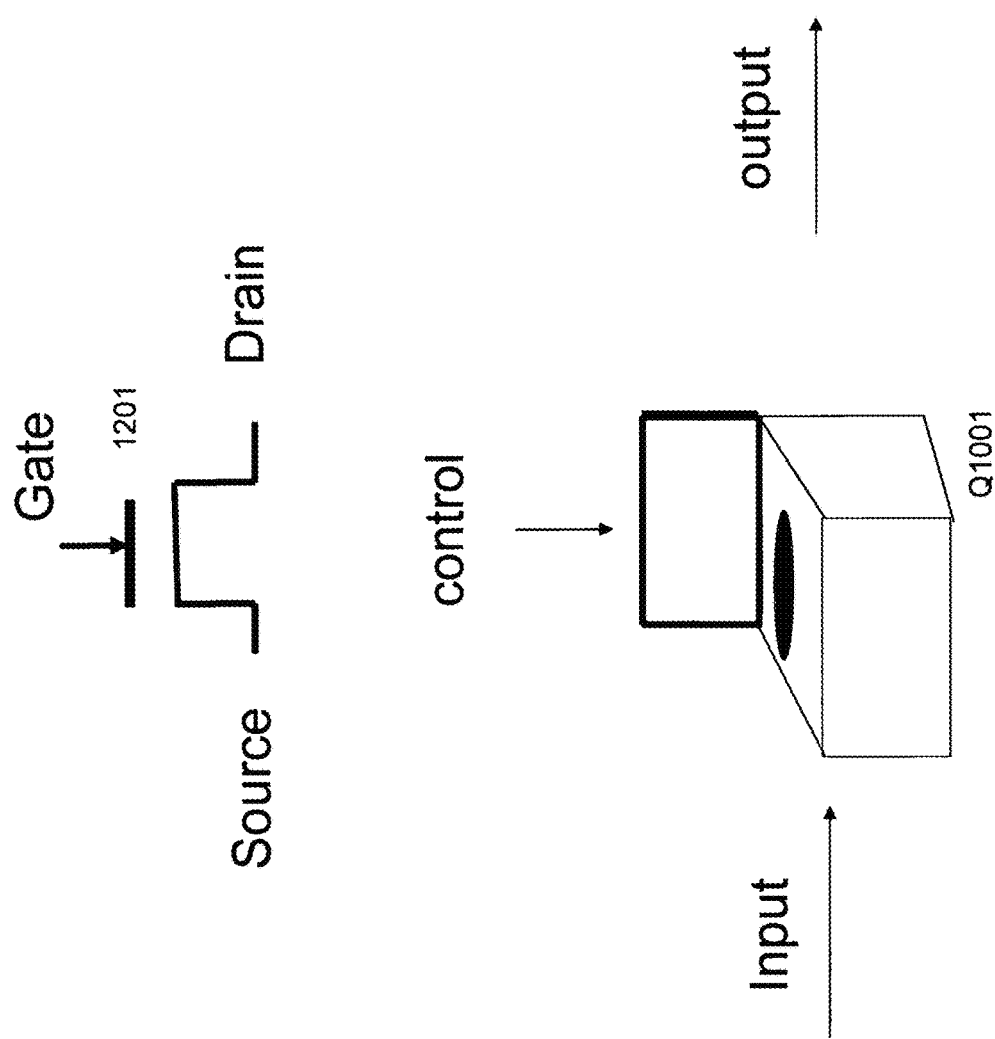
FIG. 12 is an analogy between a transistor and a portal.

There is an extra important element. FIG. 12 shows a comparison between a transistor 1201 and portal 1001. A reader with a background in electrical engineering or computer science should recognise the source, drain and gate of the transistor. Current flows from the source to the drain, under the control of a signal (voltage) at the gate. It is only a small exaggeration that most digital computing builds atop transistor 1201. The gate is the control, upon which much control logic can be used. Compare this to portal 1001. There is an input of an item (real or virtual). Output appears at 1 or more portals. The control element of the portal acts at the gate of a transistor. Thus above we referred to a Multiplier as fan out, and a Merger as fan in. The portals also have the equivalent of a mux (multiplexer). Imagine an event consisting of a player putting an item into 1 portal, another player doing likewise at another portal, and a third player at a third portal. These events could be coordinated to happen within seconds of each other, via the games on their devices. (The players need not be on the same team). Logic on the game server decides which one of these items is chosen to be sent to a fourth portal. In all essential ways this is the operation of a mux.

Figure 13:
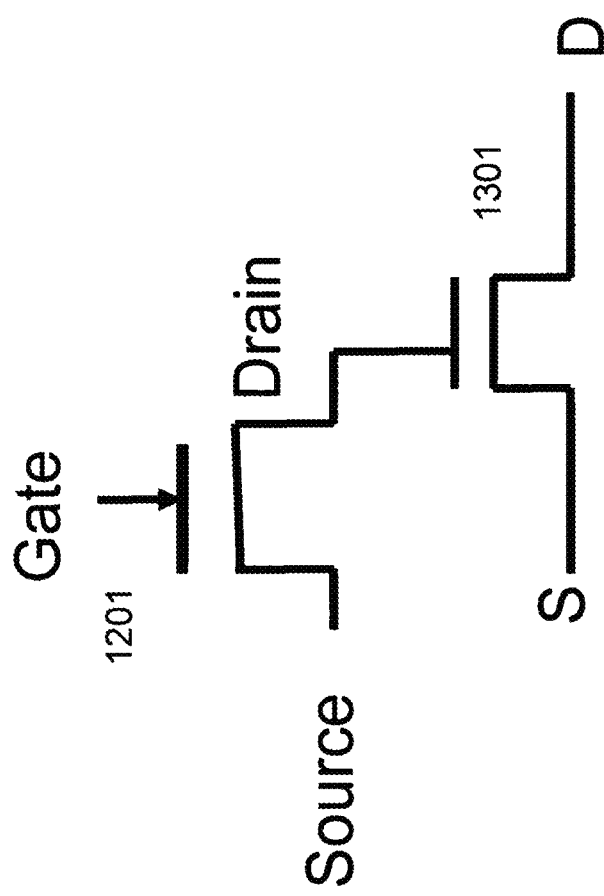
FIG. 13 shows the output of a transistor controlling another transistor.

Another example is how the output (drain) of a transistor can control another transistor. FIG. 13 shows this. Similarly FIG. 14 shows portal 1001 accepting an input of a teddy bear EXOR a kitten. The result of this is sent to the controls of portal 1041, which might be in a different park. 1401 gets a goat as input. If 1001 got a teddy bear, then 1401 will send the goat to Shanghai. But if 1001 got a kitten, then 1401 will send the goat to Tokyo. Note that 1401 does NOT need to eject a teddy bear or kitten. But if 1401 has a screen, it might display an image of the item it got from 1001.

We suggest that FIGS. 13 and 14 are essentially the same in the context of this application.

We do not suggest that every basic electrical transistor circuit has a portal analog. But we hope that the above comparisons demonstrate how intricacies can be added to a game than spans several parks.

There are broadly 2 approaches to using portals. One is to let all the above template modes of a portal be available to every player who is at the portal.

This is also equivalent to letting the player make those choices via her mobile device instead of thru buttons and other controls that are physically part of the portal. The other approach centralizes the control at the portals and lets other players alter those controls.

For the latter, imagine that a portal can be flipped from sending only to receiving only to bidirectional. Further, this transmission mode can be controlled by a player or by the game server. Some portals might always be controllable by players, while other portals are always controlled by the game server. Or for a given portal, sometimes players control its mode while other times the game server does so. But this could in turn be altered via higher game logic.

Another issue is that in the parks several games could run simultaneously. For 1 game, a given portal might be send only. For another game, that portal can be bidirectional.

10] Reification and Anti-Reification;

A virtual item can be sent to a portal. The item exists only in the game server and as images on the computer screens of the visitors and viewers. When the virtual item is sent to the portal, this can be by similar means to a real item. Except that, for example, the visitor guides his phone near the portal, and can capture the image of the portal on his screen. Then via the game app, he picks a button on his screen to send the item to the portal. Other steps can be done to send it to a destination portal. Perhaps using a combination of steps on his device and the physical buttons of the portal.

At the destination portal a copy of the virtual item can be available for capture by a nearby visitor. The portal could show an image of the item on a screen, to aid the visitor. But another mode is reification. The portal converts the virtual item to a real item. The latter can look similar to the virtual item at the other park. Or it could look very different.

As with the Transformer, a reification can be done to make multiple items at 1 or more destination portals.

The inverse process of anti-reification is also possible. A visitor brings a real item to the transmission portal, as described earlier. Now the destination portal emits a virtual item. This can be a virtual copy of the real item, or a virtual representation of a different entity. The real item at the transmission portal can perhaps be reused as a fresh item later by another team.

11] Smart Toy that Uses Portals;

So far, the item (eg a toy) that goes into and comes out of a portal is essentially an inert object, with the possible exception of having a transponder or similar embedded device. This section considers when the item is what we term a Smart Toy. It does not have to be a toy, but given the recreational nature of the park, this is likely to be a common case. The Smart Toy can record various types of data—images, video, audio, geolocations, accelerations etc. These can be used as a record of where it has been. It can also record what clues or rewards or monsters have been captured during its tour of a park, while being carried or towed or pushed by players. In general, the Toy does not have to be self propelled. When the players find a clue (etc), they might control the Toy in such a way so that it takes a photo of the clue, say, as a marker of their achievement. For example, if it is a teddy bear, they could point the eyes at the clue and squeeze the bear, triggering the taking of a photo, likely along with the coordinates being automatically recorded also.

The Toy could be directed by internal logic and possibly be under the active command of the park game server. The Toy could be able to convey to the team that is carrying it hints about what to do next.

At the start of the game, Toys might be handed out to each team. Or a team might chance upon a Toy during its wanderings. In this case, the game could define the Toy as a high value item.

The Toy might direct the team to take it to a portal. At which the Toy could interact wirelessly with the portal to tell it the destination portal. So the person carrying the Toy might only have to put the Toy on the portal, without pushing any buttons. Though game play might deliberately interpose extra steps for the team to do at the portal.

"Inside" the portal, the Toy can download its data wirelessly to the portal. Or it could have already done this during its journey thru the park. But perhaps due to the volume of data collected, and the range of the wireless transmitter in the Toy, it might be more feasible to download whilst in the portal, where there can be a transmitter very close by. The game server sends the downloaded data to the destination portal. At the latter, the data is copied into another Smart Toy. There is no requirement in general that the new Toy be the same type of toy as in the previous park. This Toy can now be reused by other teams who perhaps are sending a Toy from another portal to the current portal.

When a portal holding a deposited Toy gets the downloaded data, this can be copied to the park game server, giving a backup of the Toy in case it gets damaged during activities.

The Toy could be controlled by different teams in different parks. A variant is for the Toy to be controlled exclusively by (remote) viewers who are not part of any team. This lets some members of the remote audience take an active role in the game. The game could define how the viewer team can compete prize-wise vis a vis regular teams with visitors (and some viewers). For example, a regular team that helps carry the Toy thru a park might split the points ("gold coins", "credits" etc) 50-50 with the pure viewer team.

The game could let pure viewer teams compete against each other in a separate category from other teams. Aside from the points splitting, this can let the regular teams aid the Toys with no conflict of interest. The game can make available clues and prizes only visible on the screens of the viewer devices. The Toy teams might also get access to maps of several parks, with clues. Used this way, Toy teams ameliorate a potential problem. Most teams with visitors are likely to have all the visitors in 1 park by reasons of geography and language. To encourage a global game across several parks, the Toy teams have to take a broader view, even if they also are likely to be mostly made of people near each other or speaking the same language.

A Toy could have a linket like [Imperial Teddy]. For viewers, they might search online for that linket. A result can be a webpage with the linket clickable. And clicking it in a viewer's mobile device leads to the installing and running of a viewer app written by the parks. It can be that different parks use different apps. But using the same linket for a travelling device lets this be easily handled. A viewer who clicks the linket gets the app appropriate to the park the Toy is currently in. In some parks, the teddy might not be a teddy bear. In Tokyo park it could be a travelling bushido warrior, and in Los Angeles, it could be a cowboy.

The firm could implement for example an AI program that runs the Toy linket. This interacts with the players carrying the Toy and with the viewers. The program can be regarded as a chatbot. This application makes no distinction between an AI program and a chatbot. The program imbues the Toy with a personality that can converse perhaps via text with viewers. This can be useful in attracting and keeping a viewer audience. The program can take on a different personality in different parks to reflect the instantiation of the Toy in those parks. Also the program can have the ability to interact with many viewers in a seemingly personal and unique manner with each.

Earlier we described how a Toy could be controlled by a team made entirely of viewers. The Toy can have both the team and the AI program. The program could advise the team on what to do.

The use of an AI program for a Toy also applies to the portals. A portal can have a linket and an AI program or chatbot. Fans of the portal who are viewers can ask it about events that happened involving it. The portal can tell them what teams brought items to it and what those items were. Or for a destination portal, similar information. A portal's app can be different from the apps used by the Toys or other entities or people in the parks.

Another gamification aspect is to let a team of humans control a portal. They can decide within limits set by the game how to run the portal. This includes what if any to charge users. And whether the users' wishes as to destination portals and what operations on the transported items be done or amended or rejected.

12] Haunted Houses, Cruise Ships;

Thus far we described a plurality of theme parks. A variant can be a plurality of locations, each location having at least 1 portal, where the portal is for sending or receiving items from other portals in the sense of the previous sections. One case is where the locations are haunted houses for Halloween or New Year's Eve. A location might not have any other electromechanical devices controllable by the visitors or remote viewers. Nor is the use of the viewers a necessity. Some locations could be regular public parks with the addition of portals. The activities can still be essentially scavenger hunts.

Another case is where the locations are cruise ships. Collectively the ships are all owned by the same firm.

A group of locations could have various types. Some locations are haunted houses, others are cruise ships etc.

I claim:

1. A system of two or more theme parks;
   the parks running a game server serving a game played by visitors using mobile devices;
   each park having a transmission portal accepting as input a first item put by a first visitor via one of a) onto, b) in, c) near the transmission portal;
   the transmission portal accepting a first command from the first visitor indicating a first destination portal;
   the transmission portal being in a first theme park;
   the first destination portal being in a second theme park;
   the first theme park being different from the second theme park;
   the transmission portal determining an identification of the first item;
   the transmission portal sending a second command to the game server;
   the second command containing the identification and an address of the first destination portal;
   the game server contacting the first destination portal;
   the first destination portal making a second item accessible for the taking by a second visitor near the first destination portal;
   where the second item is a different type than the first item;
   where the first item was carried through the park by one or more visitors prior to arrival at the transmission portal;
   where the first item has sensors that collected data;
   where the transmission portal copies data from the first item;
   where the data is transmitted to the first destination portal; and
   where the first destination portal downloads the data to the second item.

2. The system of claim 1, where the game server chooses the second item randomly from a set of items,
   where a chosen second item is of a different type than the first item.

3. The system of claim 1, where the first item represents a young organism; where the second item represents an older organism of the same species as the young organism.

4. The system of claim 1, where the first item represents an old organism; where the second item represents a young organism of the same species as the old organism.

5. The system of claim 1, where the first item represents a first organism of a specific gender; where the second item represents a second organism of the same species as the first organism, and has a different gender than the first organism.

6. The system of claim 1, where the first item depicts a person of a first profession; where the second item depicts a person of a second profession.

7. The system of claim 1, where the transmission portal accepts a third command from the first visitor indicating a second destination portal;
   the second destination portal being in a third theme park;
   the second command being extended to containing an address of the second destination portal; the game server contacting the second destination portal; the second destination portal making a third item accessible for the taking by the second visitor near the second destination portal.

8. The system of claim 7, where the third item is a copy of the second item.

9. The system of claim 7, where the first item, the second item and the third items have mutually different identifications.

10. The system of claim 1, where a mobile viewing application is used by viewers outside the parks to watch and interact with the visitors.

11. The system of claim 1, where the sensors have one or more of a) audio, b) video, c) location, d) orientation data acquired during the passage of the first item through the park.

12. The system of claim 1, where the visitors who carry the first item are in a same team as the visitors who carry the second item.

13. The system of claim 1, where the visitors who carry the first item are in a different team from the visitors who carry the second item.

14. The system of claim 1, where a team of viewers is associated with the first item and the second item; where the team of viewers is different from a team of visitors who carried the first item, and different from a team of visitors who carried the second item.

15. The system of claim 1, where the first item and the second item are tangible objects.

16. The system of claim 1, where the first item is a tangible object; where the second item is a virtual object.

17. The system of claim 1, where the first item is a virtual object; where the second item is a tangible object.

* * * * *